United States Patent
Nonaka

(10) Patent No.: US 6,633,403 B1
(45) Date of Patent: Oct. 14, 2003

(54) IMAGE FORMING APPARATUS AND IMAGE PROCESSING METHOD FOR LIMITING THE COMMUNICATION BETWEEN PRINT CONTROLLER AND PRINT ENGINE BASED ON LOAD OF THE PRINT ENGINE

(75) Inventor: Takashi Nonaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/471,028

(22) Filed: Dec. 23, 1999

(30) Foreign Application Priority Data

Dec. 25, 1998 (JP) .......................... 10-371648
Dec. 21, 1999 (JP) .......................... 11-362371

(51) Int. Cl.$^7$ ............................................. G06F 15/00
(52) U.S. Cl. ..................................... 358/1.15; 358/1.1
(58) Field of Search .................... 358/1.1, 1.9, 1.12, 358/1.13, 1.15, 474, 500; 399/10, 16, 19, 38, 130; 347/111, 112, 113, 262, 264

(56) References Cited

U.S. PATENT DOCUMENTS

| | | | | | |
|---|---|---|---|---|---|
| 5,303,336 A | * | 4/1994 | Kageyama et al. | ........ | 358/1.15 |
| 5,647,056 A | * | 7/1997 | Barrett et al. | ........... | 709/220 |
| 5,940,582 A | * | 8/1999 | Akabori et al. | .......... | 358/1.13 |
| 6,382,504 B1 | * | 5/2002 | Lyons et al. | ............ | 235/379 |

FOREIGN PATENT DOCUMENTS

| | | | |
|---|---|---|---|
| EP | 0506594 A2 | * | 9/1992 |
| EP | 0575168 A1 | * | 12/1993 |
| EP | 0926586 A2 | * | 6/1999 |

* cited by examiner

*Primary Examiner*—Gabriel Garcia
(74) *Attorney, Agent, or Firm*—Fitzpatrick, Cella, Harper & Scinto

(57) ABSTRACT

The state of an engine control section is detected, it is determined on the basis of the state of the engine control section whether communication between a printer controller and the engine control section can be performed, and control is performed to limit communication. Even when a plurality of controllers are present, a composite operation is allowed without excessively increasing the communication load.

14 Claims, 30 Drawing Sheets

FIG. 3

| SIGNAL NAME | ABBREVIATION | DIRECTION OF SIGNAL |
|---|---|---|
| PRINTER POWER READY | /PPRDY | CONTROLLER ← PRINTER |
| CONTROLLER POWER READY | /CPRDY | CONTROLLER → PRINTER |
| READY | /RDY | CONTROLLER ← PRINTER |
| PRINT | /PRNT | CONTROLLER → PRINTER |
| TOP OF PAGE | /TOP | CONTROLLER ← PRINTER |
| LINE SYNCHRONOUS | /LSYNC | CONTROLLER ← PRINTER |
| VIDEO CLOCK | /VCLK | CONTROLLER → PRINTER |
| VIDEO ENABLE | /VDOEN | CONTROLLER → PRINTER |
| VIDEO | /VDO | CONTROLLER → PRINTER |
| CONTROLLER CLOCK | /CCLK | CONTROLLER → PRINTER |
| COMMAND BUSY | /CBSY | CONTROLLER → PRINTER |
| COMMAND | /CMD | CONTROLLER ← PRINTER |
| STATUS BUSY | /SBSY | CONTROLLER ← PRINTER |
| STATUS | /STS | CONTROLLER ← PRINTER |
| PAPER FEED | /PFED | CONTROLLER ← PRINTER |
| SPEED CHANGE | /SPCHG | CONTROLLER ← PRINTER |
| PAPER DELIVERY | /PDLV | CONTROLLER ← PRINTER |
| TOP OF PAPER | /TOPR | CONTROLLER ← PRINTER |
| CONDITION CHANGE REPORT | /CCRT | CONTROLLER ← PRINTER |

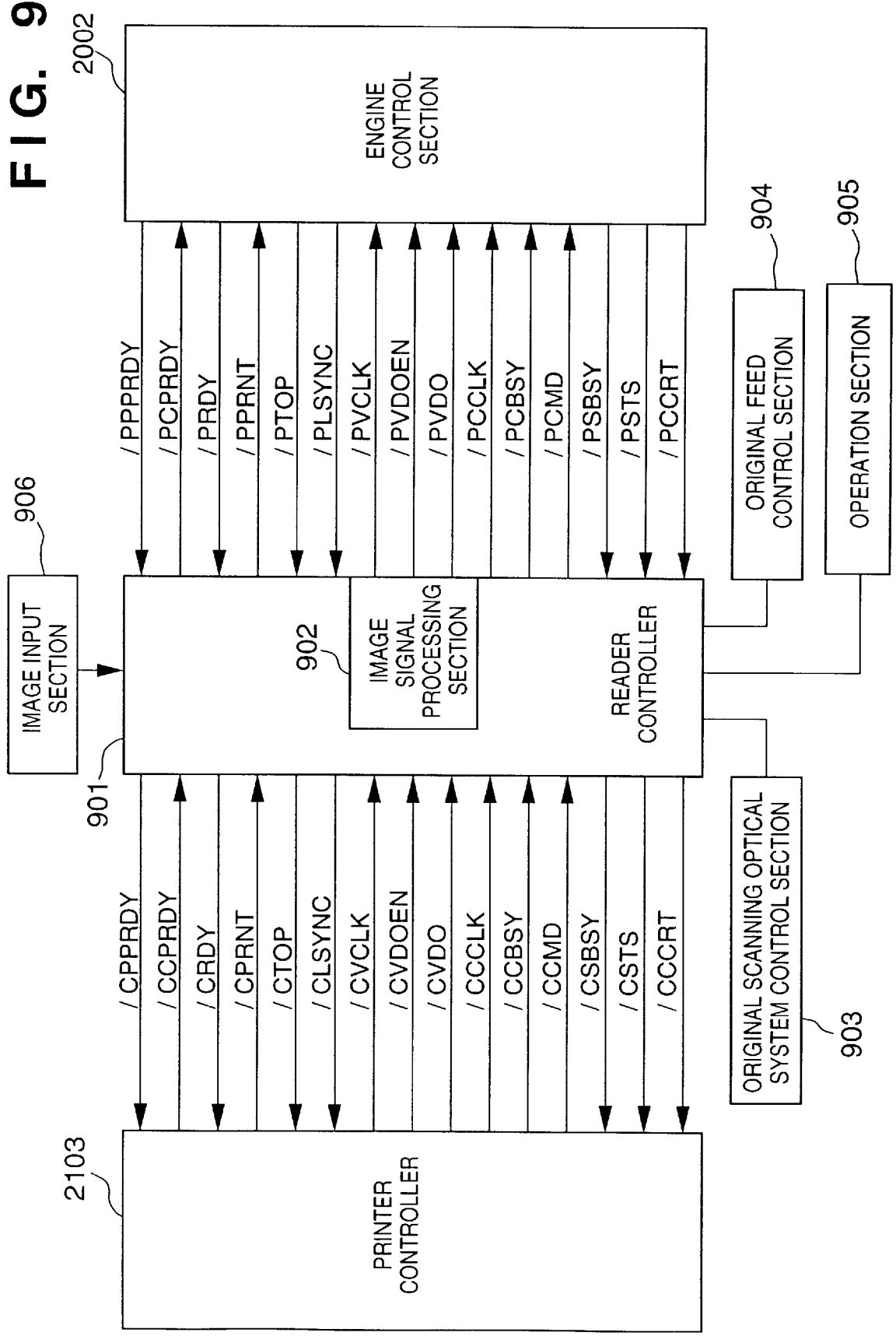

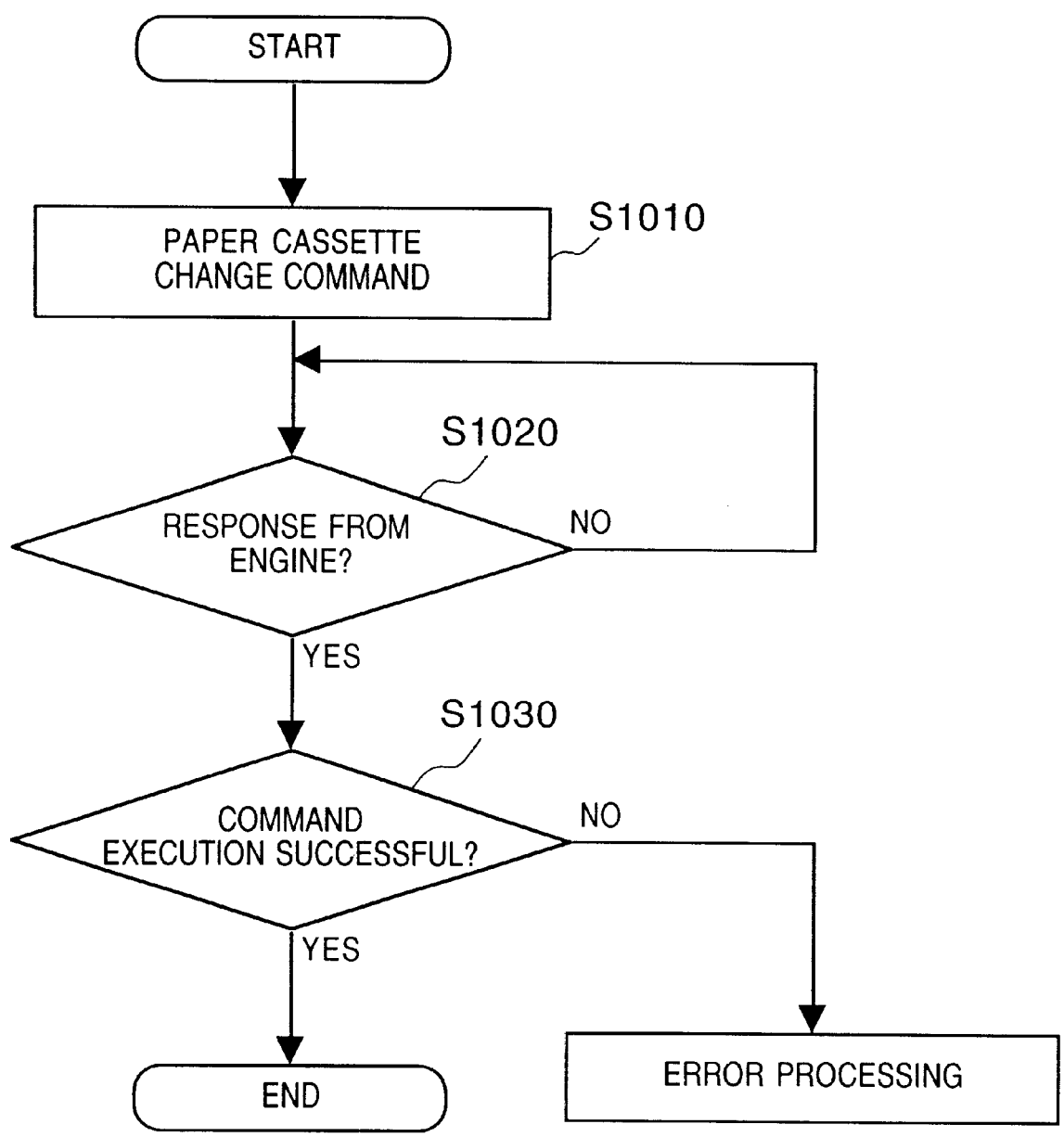

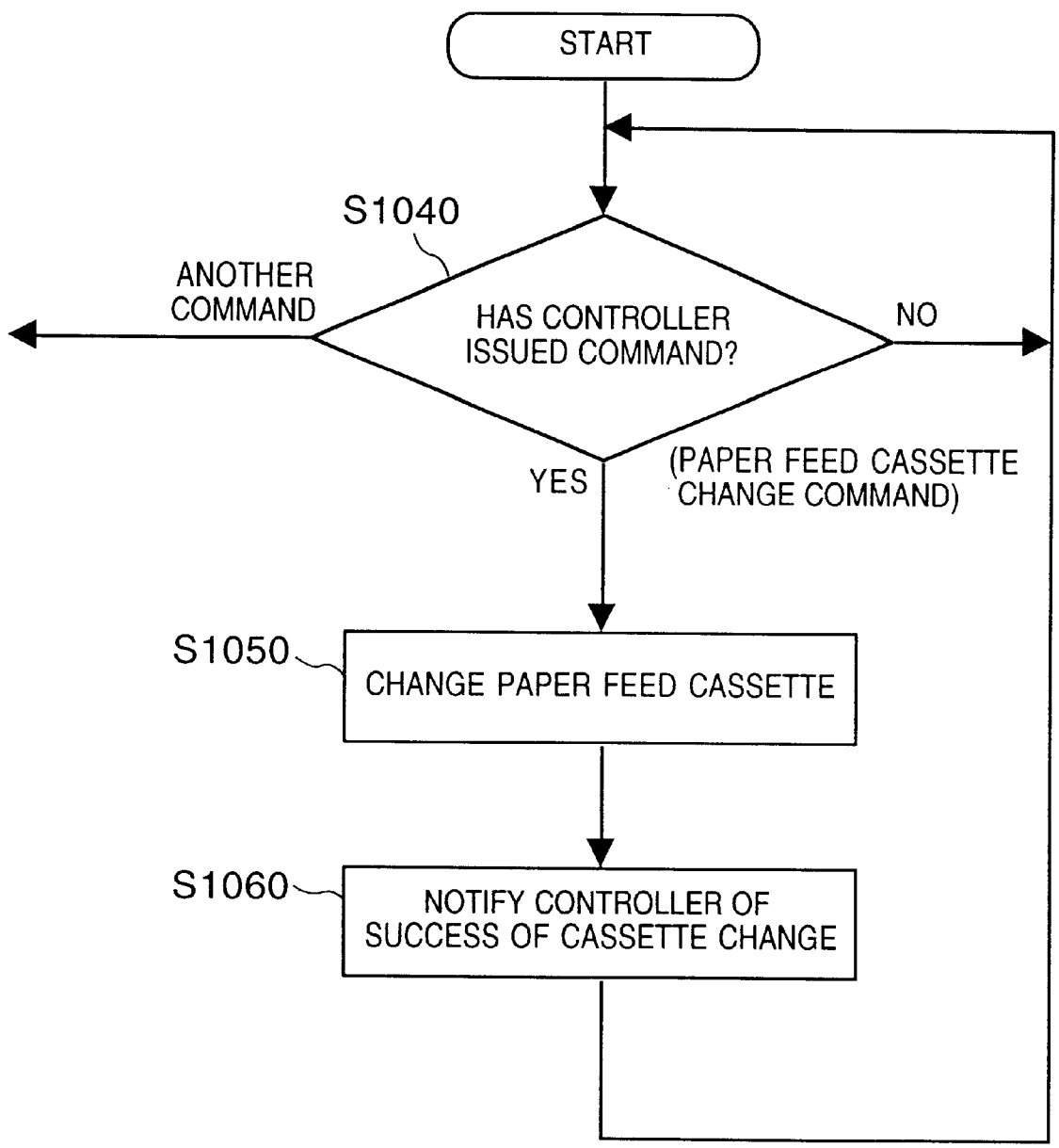

IMAGE FORMING APPARATUS AND IMAGE PROCESSING METHOD FOR LIMITING THE COMMUNICATION BETWEEN PRINT CONTROLLER AND PRINT ENGINE BASED ON LOAD OF THE PRINT ENGINE

BACKGROUND OF THE INVENTION

The present invention relates to an image forming apparatus and image forming method in which a reader controller for controlling the copying function mediates between a DC controller for controlling image formation and a PDL controller for controlling the print function, thereby realizing communication between the DC controller and the composite function of the PDL controller.

Conventionally, the print function of a printer is realized only by controlling it with a PDL controller. The copying function of a printer is realized only by controlling it with a reader controller. That is, a printer uses a single controller. Even a composite function can be realized by controlling two functions with a single controller.

Recently, it is, however, necessary to realize a copying operation only by adding a reader controller without changing the arrangement of an existing PDL controller and printer that realize a print function.

When the conventional arrangement is used, the number of times of communication with the printer inevitably increases because of the plurality of controllers. Communication between the controllers is also essential, and the load of the CPU increases.

SUMMARY OF THE INVENTION

It is an object of the present invention to provide an image forming apparatus and method that solve the above problems. In order to achieve this object, the apparatus and method have the following arrangement and steps.

There is provided an image forming apparatus in which a reader controller is inserted between a printer controller and an engine control section to allow a composite functional operation, comprising:

first communication means for communicating between the printer controller and the reader controller;

second communication means for communicating between the reader controller and the engine control section;

detection means for detecting a load state of the engine control section through the second communication means;

update means for, in accordance with a request of status information from the reader controller, acquiring latest status information of the engine control section through the second communication means and communicating with the reader controller to update the status information;

communication control means for, in communication for a confirmation request of the status information of the engine control section from the printer controller, when the load of the engine control section is large on the basis of the detected load state, communicating the updated status information to the printer controller through the first communication means, and when the load of the engine control section is small, communicating the latest status information updated by the update means through the second communication means to the printer controller through the first communication means, wherein the communication control means limits communication between the printer controller and the engine control section in accordance with a change in the state of the engine control section to control a communication amount.

There is also provided an image forming method in which an image forming apparatus having a reader controller inserted between a printer controller and an engine control section is used, and information is processed by a composite functional operation of the image forming apparatus to form an image, comprising:

the first communication step of processing communication between the printer controller and the reader controller;

the second communication step of processing communication between the reader controller and the engine control section;

the detection step of acquiring information representing a load state of the engine control section in the second communication step and detecting the load state of the engine control section on the basis of the information;

the update step of, in accordance with a request of status information from the reader controller, acquiring latest status information of the engine control section through the second communication step and communicating with the reader controller to update the status information;

the communication control step of, in communication for a confirmation request of the status information of the engine control section from the printer controller, when the load of the engine control section is large on the basis of the detected load state, communicating the updated status information to the printer controller through the first communication step, and when the load of the engine control section is small, communicating the latest status information updated in the update step through the second communication step to the printer controller through the first communication step, wherein the communication control step comprises limiting communication between the printer controller and the engine control section in accordance with a change in the state of the engine control section to control a communication amount.

According to a preferred aspect of the present invention, the image forming apparatus further comprises output means for outputting received information to the engine control section, the output means receiving print information output from the printer controller and image information input for copying and selectively outputting the received information in accordance with the load state of the engine control section as the result of detection by the detection means.

According to a preferred aspect of the present invention, in the image forming apparatus, the communication control means suppresses processing of received information and sets the information in a queued state in the order of reception in accordance with the state of the engine control section as the result of detection by the detection means.

According to a preferred aspect of the present invention, when received information is to be set in a queued state in accordance with the state of the engine control section as the result of detection by the detection means, the communication control means outputs a pseudo processing success command to th e printer controller.

According to a preferred aspect of the present invention, in the image forming apparatus, when the engine control section can communicate in accordance with the state of the engine control section as the result of detection by the detection means, the communication control means transmits the in formation in the queued state to the engine control section.

According to a preferred aspect of the present invention, in the image forming apparatus, when a confirmation request of the status information of the engine control section is received from the printer controller, and the status information updated by the update means suffices as the status information requested for confirmation, the communication control means notifies the printer controller of the updated status information through the first communication means, and when the updated status information does not suffice, the communication control means communicates with the engine control section through the second communication means and notifies the printer controller of the result through the first communication means.

According to a preferred aspect of the present invention, the image forming method further comprises the output step of outputting received information to the engine control section, the output step comprising receiving print information output from the printer controller and image information input for copying and selectively outputting the received information in accordance with the load state of the engine control section as the result of detection in the detection step.

According to a preferred aspect of the present invention, in the image forming method, the communication control step comprises suppressing processing of received information and sets the information in a queued state in the order of reception in accordance with the state of the engine control section as the result of detection in the detection step.

According to a preferred aspect of the present invention, in the image forming method, the communication control step comprises, when received information is to be set in a queued state in accordance with the state of the engine control section as the result of detection in the detection step, outputting a pseudo processing success command to the printer controller.

According to a preferred aspect of the present invention, in the image forming method, the communication control step comprises, when the engine control section can communicate in accordance with the state of the engine control section as the result of detection in the detection step, transmitting the information in the queued state to the engine control section.

According to a preferred aspect of the present invention, in the image forming method, when a confirmation request of the status information of the engine control section is received from the printer controller, and the status information updated in the update step suffices as the status information requested for confirmation, the communication control step comprises notifying the printer controller of the updated status information through the first communication step, and when the updated status information does not suffice, the communication control step comprises communicating with the engine control section through the second communication step and notifying the printer controller of the result through the first communication step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing the list of video I/F signals;

FIG. 9 is a view showing the connection of a built-in reader controller;

FIG. 10A is a flow chart showing a communication sequence in an arrangement without the reader and, more specifically, the processing sequence in the printer controller;

FIG. 10B is a flow chart showing a communication sequence in the arrangement without the reader and, more specifically, the processing sequence in the engine control section;

FIG. 26 is applied to step S2505 in FIG. 25.

DETAILED DESCRIPTION OF THE PREFERRED EMBODIMENTS

Preferred embodiments of the present invention will be described in detail in accordance with the accompanying drawings.

Embodiment 1

An embodiment of the present invention will be described below in detail with reference to the accompanying drawings.

[Overall Arrangement]

Figure 1:
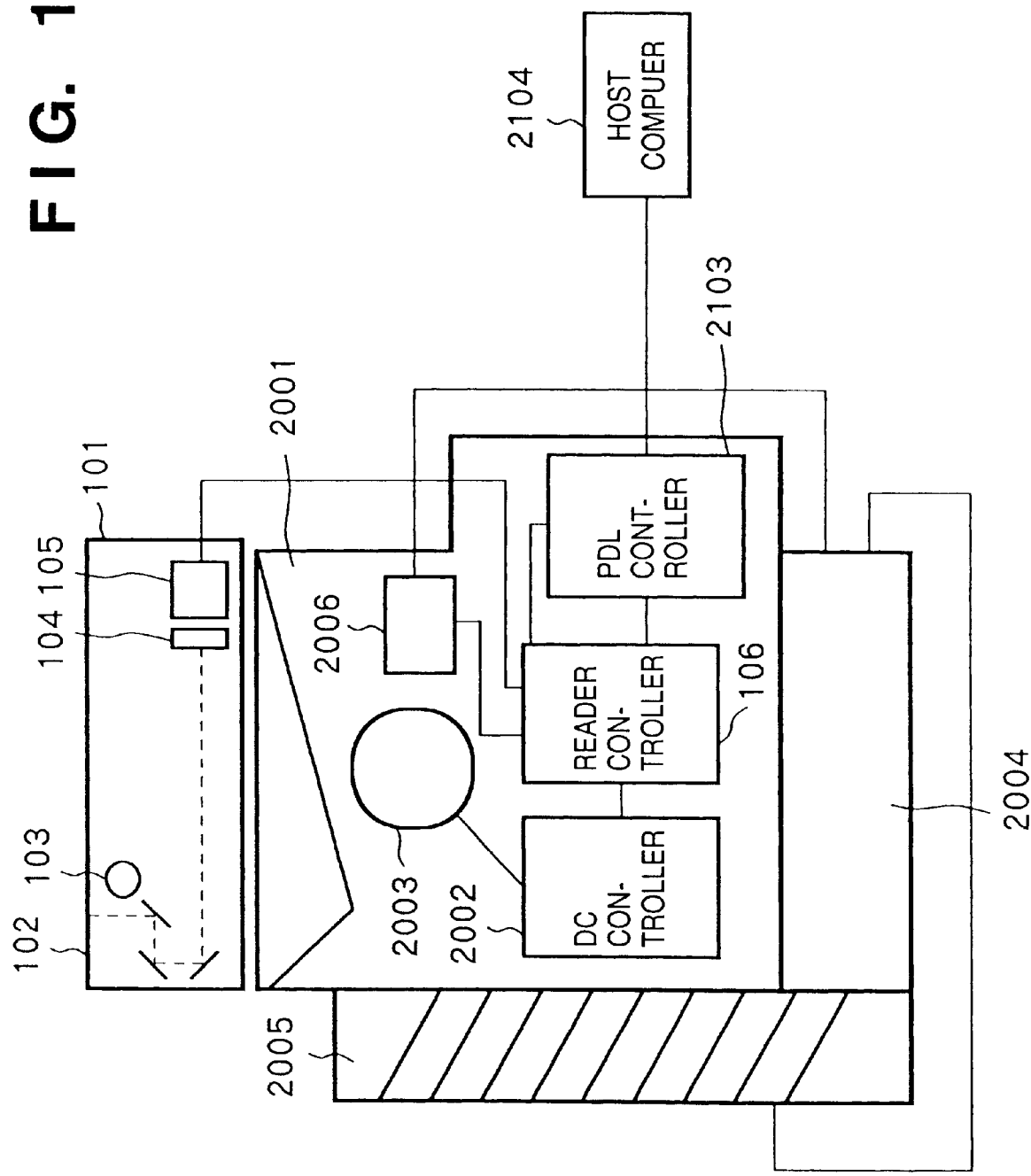
FIG. 1 is a view showing the overall arrangement of a controller and printer.
Figure 16:
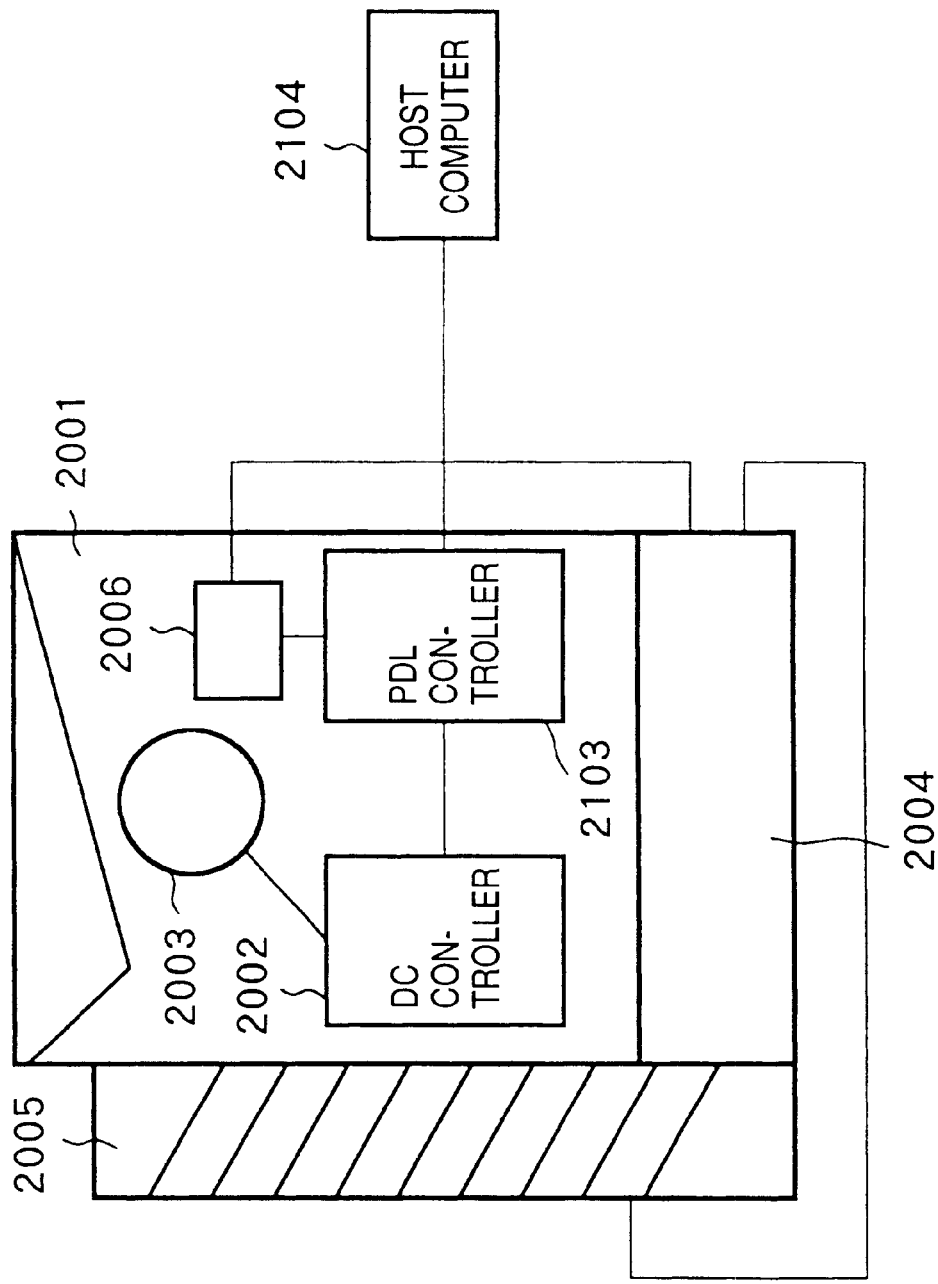
FIG. 16 is a view showing the schematic arrangement of a printer.

FIG. 1 is a view showing the overall arrangement of an image forming apparatus according to an embodiment of the present invention. Referring to FIG. 1, reference numeral 101 denotes a reader main body; 102, an original table; 103, a light source; 104, a photoelectric conversion means; 105, an analog/digital conversion means; and 106, a reader controller. Reference numeral 2001 denotes a printer main body; 2002, a DC controller for controlling paper conveyance in the printer or image formation; 2003, an image formation section. A printer controller 2103 shown in FIG. 17 is incorporated in the printer main body 2001, as shown in FIG. 16.

Figure 17:
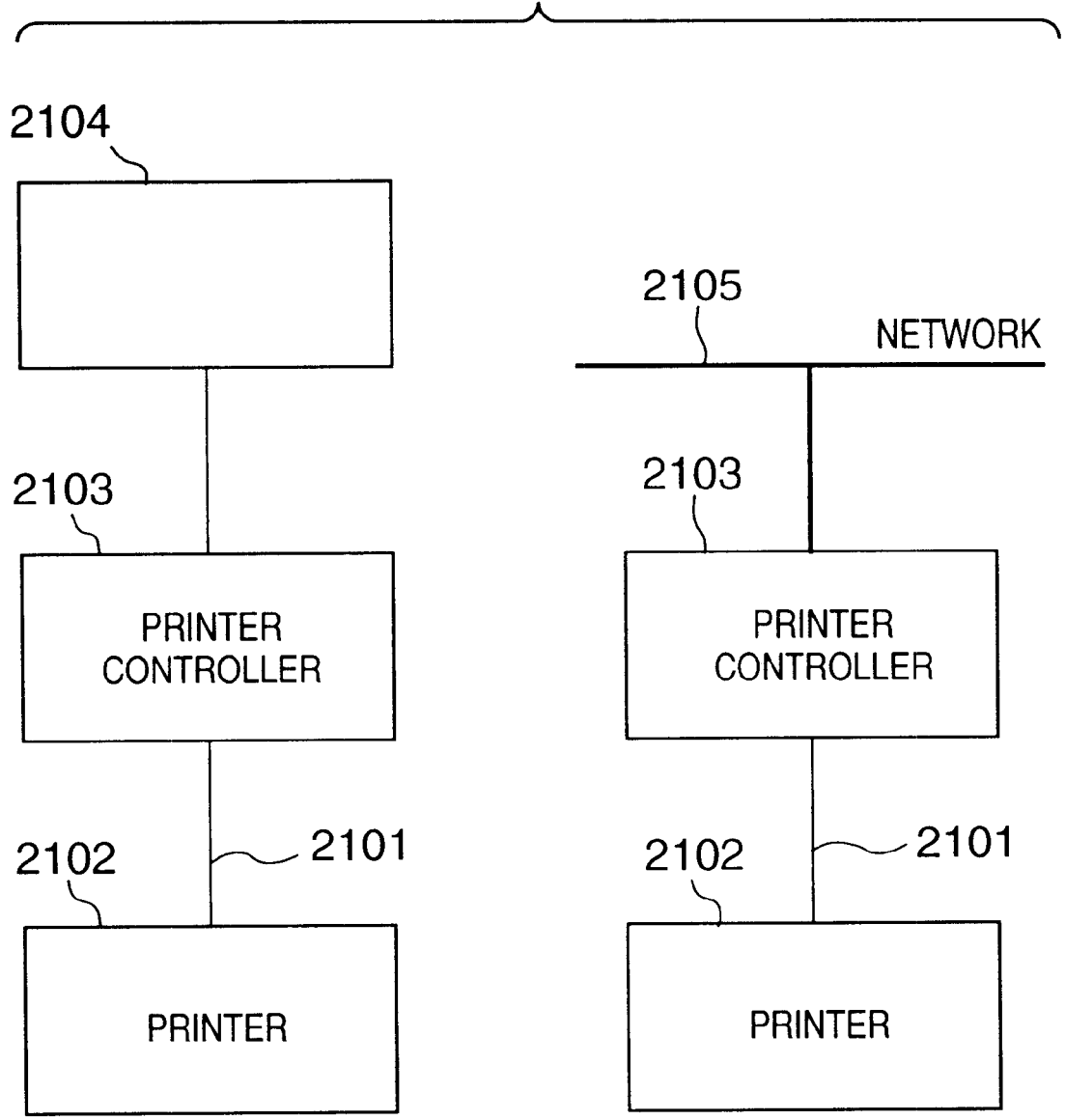
FIG. 17 is a view showing the system connection of the printer.

A host computer 2104 is connected to the printer controller 2103 in a one-to-one correspondence or through a network 2105, as shown in FIG. 17. Reference numeral 2004 denotes an optional paper feed cassette deck; 2005, an optional sorter; and 2006, an option controller for controlling the optional cassette deck and optional sorter.

The reader controller 106 has a function of controlling communication with a mean for processing a digital image output from the analog/digital conversion means, a motor control means (not shown) for original reading, and the DC controller 2002 or printer controller 2103. In the present invention, the reader controller is arranged in the printer main body 2001, and no external cable is used for communication control with the DC controller 2002 or printer controller 2103.

[Arrangement of Printer Controller and Printer]

In the image forming apparatus of this embodiment, the reader controller is connected between the printer controller and the printer to perform processing between the printer controller and the printer. As the assumption for this system, the arrangement of the printer controller and printer will be described first.

The outline will be described with reference to FIG. 17. A video I/F 2101 performs communication between a printer 2102 (to be described later) and the printer controller 2103. I/F signals will be described later in detail. The printer 2102 forms the visual image of an electrical image signal received via the I/F 2101, transfers the image to printing paper, fixes the image, and outputs it.

To realize the image formation sequence, the printer controls various loads. The printer also detects the state of the printer and notifies the printer controller of it.

The printer controller 2103 receives data sent from the host computer 2104 or through the network 2105. Data is sent in various formats including bitmap data and PDL (Page Description Language) data. This data is bitmapped on a memory and transferred to the printer 2102 as data in a raster format. In this way, the data prepared in the host computer can be printed.

[Video Interface]

Figure 2:
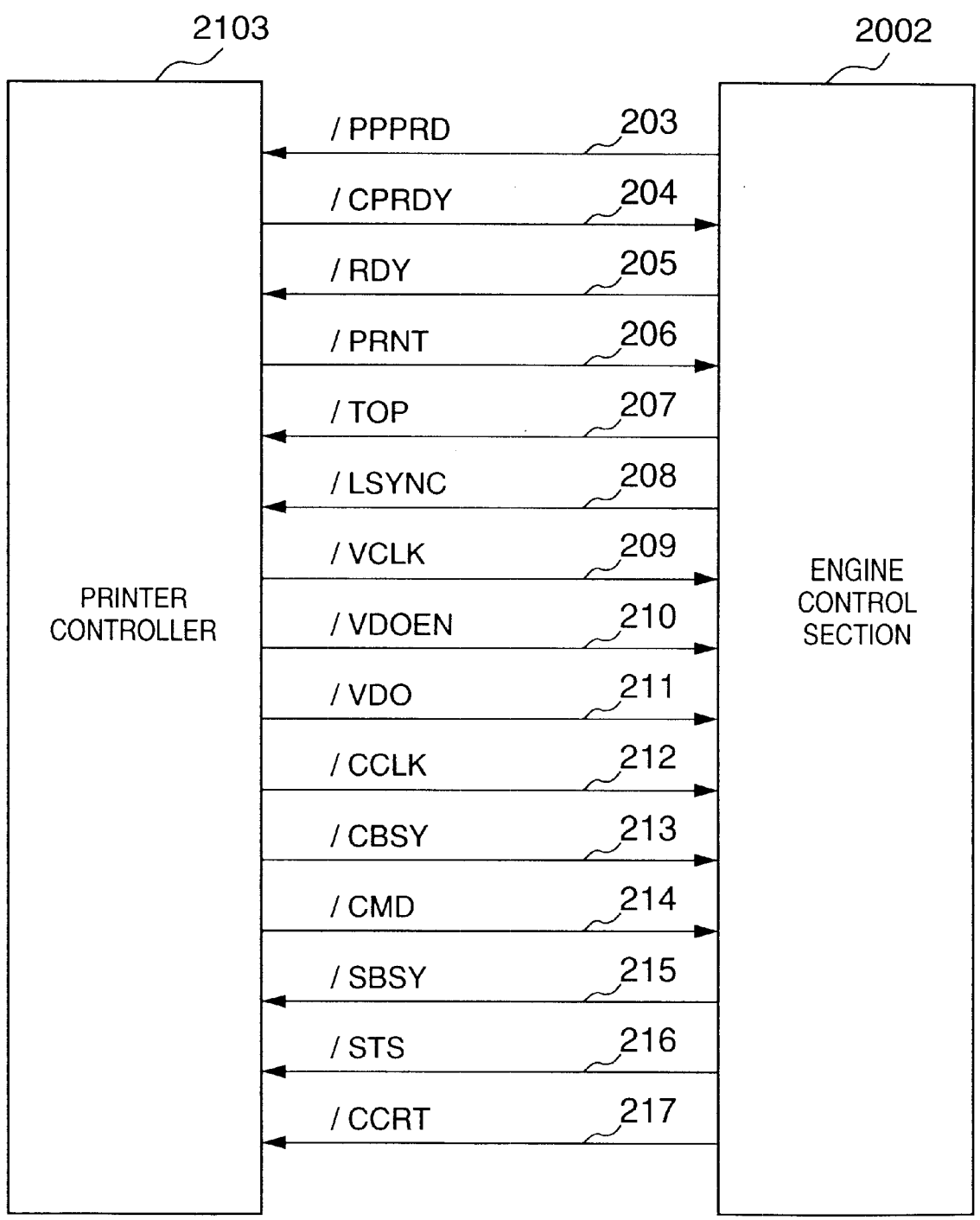
FIG. 2 is a view showing the connection between a printer controller and an engine control section.

The video I/F 2101 connecting the printer controller and printer will be described next in detail. Referring to FIG. 2, reference numeral 2103 denotes the printer controller. The engine control section (DC controller) 2002 controls the engine in the printer 2101 shown in FIG. 17. Signals as shown in FIG. 2 are exchanged between the printer controller and the engine control section.

FIG. 3 is a table showing the list of video I/F signals. Only representative signals shown in FIG. 2 will be described.

A /PPRDY signal 203 (FIG. 2) represents that communication with the printer controller can be performed after the printer is powered on, and processing such as initial setting is ended.

A /CPRDY signal 204 represents that communication with the engine control section can be performed after the printer controller is powered on, and processing such as initial setting is ended.

A /RDY signal 205 represents that the engine control section can perform printing in accordance with a print start instruction (/PRNT signal to be described later) from the printer controller. This signal is TRUE only when each section in the printer is normally operating, e.g., the temperature in the fixing unit has reached a predetermined temperature, no printing paper remains in the printer, or the polygon mirror rotates at a predetermined speed.

With a /PRNT signal 206, the printer controller instructs the engine control section to start or continue printing.

A /TOP signal 207 is a sync signal as a reference of vertical image scanning. The /TOP signal 207 is transferred from the engine control section to the printer controller. This signal is output a predetermined time after the /PRNT signal 206 is output from the printer controller.

A /LSYNC signal 208 is a sync signal as a reference of horizontal scanning by the printer controller. This signal is output to the printer controller a predetermined time after the /PRNT signal 206 is output from the printer controller, like the /TOP signal.

A /VCLK signal 209 is a synchronization clock for /VDOEN and /VDO signals (to be described later). The printer controller generates a clock having a predetermined frequency corresponding to an image signal.

A /VDOEN signal 210 controls image signal reception from the printer controller to the engine control section. The engine control section detects in synchronism with the /VCLK whether the /VDOEN signal is TRUE or FALSE. When the signal is TRUE, the engine control section receives the image signal. When the signal is FALSE, the image signal is not received.

A /VDO signal 211 is video data. The printer controller outputs the video data in synchronism with the /VCLK signal using the /TOP signal as a reference in the vertical direction and the /LSYNC signal as a reference in the horizontal direction.

A /CCLK signal 212 is output from the printer controller as a synchronization clock when the printer controller transmits a serial command to the engine control section or when the engine control section returns a serial status to the printer controller.

A /CBSY signal 213 indicates the engine control section that the printer controller is transmitting a serial command using a /CMD signal (to be described later).

A /CMD signal 214 is used by the printer controller to transmit serial information to the engine control section. This serial information will be referred to as a command.

A /SBSY signal 215 notifies the printer controller that the engine control section returns a serial status using an /STS signal.

An /STS signal 216 is used by the engine control section to return serial information to the printer controller. This serial information will be referred to as a status.

A /CCRT signal 217 notifies the printer controller of a change in status in the printer. The printer controller receives this signal and issues, using the /CMD signal, a command for inquiring the engine-side status that has changed. The engine control section notifies the printer controller of the status using the /STS signal.

Figure 4:
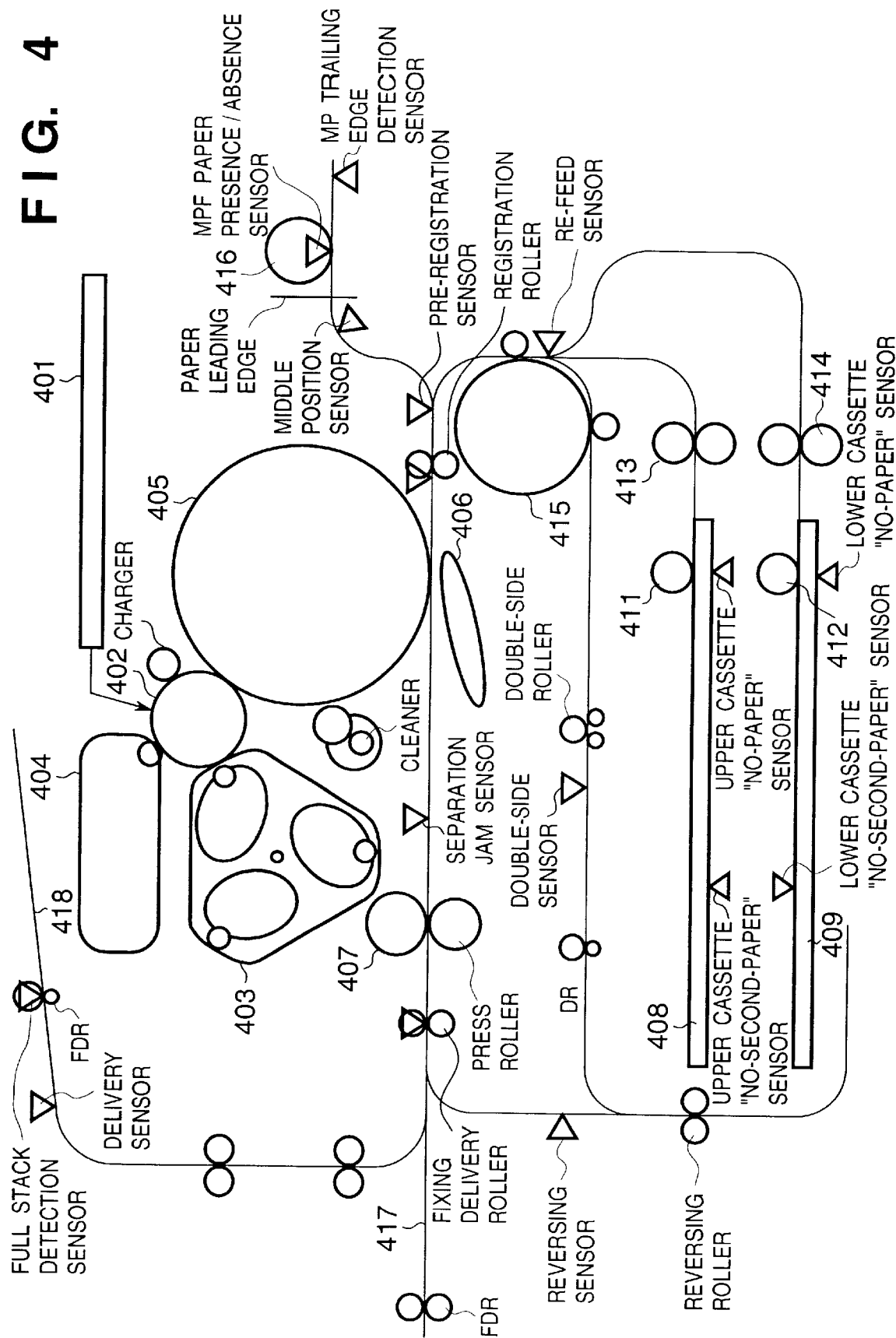
FIG. 4 is a view showing a paper convey mechanism.

The printer controlled by the engine control section will be described next with reference to FIG. 4. FIG. 4 shows the front side of the printer.

A scanner 401 receives the image signal /VDO sent from the printer controller, converts the signal into a laser beam, and irradiates a photosensitive body 402 with the beam to form an image on the photosensitive body. As the photosensitive body rotates counterclockwise, the image reaches a color developing unit 403 or a black developing unit 404. The developing unit 403 or 404 has a function of attracting a toner onto the photosensitive body in accordance with charges on the photosensitive body (developing the image). For a monochromatic image, only the developing unit 404 operates. For a color image, the two developing units 403 and 404 are used. Next, the image formed on the photosensitive body is transferred to an intermediate transfer member 405 that rotates clockwise. A monochromatic image is transferred onto the intermediate transfer member by one revolution while a color image by four revolutions.

A printing paper sheet fed from an upper cassette 408 or lower cassette 409 by a pickup roller 411 or 412 is conveyed in accordance with feed rollers 413 or 414. The paper is further conveyed to registration rollers by a convey roller 415.

The timing is controlled such that when image formation on the above-described intermediate transfer member is ended, the paper sheet comes between the intermediate transfer member 405 and a transfer belt 406. When the printing paper sheet reaches this position, the transfer belt comes into contact with the intermediate transfer member to transfer the toner to the printing paper sheet. A fixing roller 407 fixes the image transferred to the printing paper sheet by heat and pressure.

The printing paper sheet having the fixed image is conveyed to a face-up delivery port 417 or a face-down delivery port 418 which is designated by the printer controller in advance and delivered. With this procedure, the image information sent from the printer controller can be output.

Figure 5:
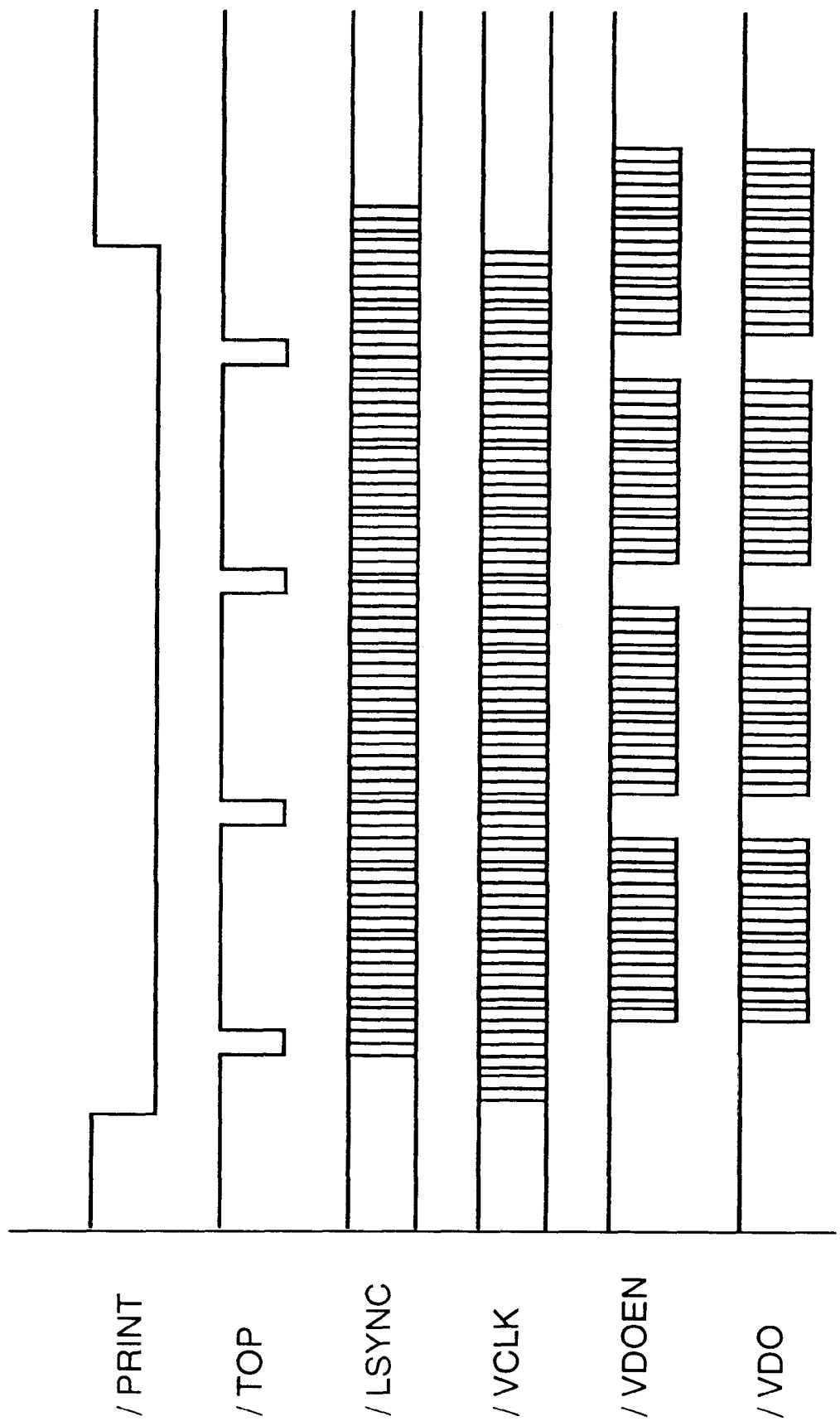
FIG. 5 is a timing chart of image signals.

FIG. 5 shows the timings of the signals exchanged through the video I/F. The above-described video I/F signals are shown in accordance with the lapse of time.

When preparation of image information is ended, the printer controller sets the /PRNT signal at low (TRUE) to notify the engine control section of it. Simultaneously, the printer controller generates the signal /VCLK as the image sync signal used for transfer of the image signal.

In response to the signal, the engine control section performs various setting operations in the printer. When preparation for image reception is ended, the engine control section outputs the /TOP signal and /LSYNC signal to the printer controller. In accordance with the /TOP signal and /LSYNC signal, the printer controller transfers the image signal /VDO and /VDOEN signal as an image valid signal to the engine control section.

Figure 6:
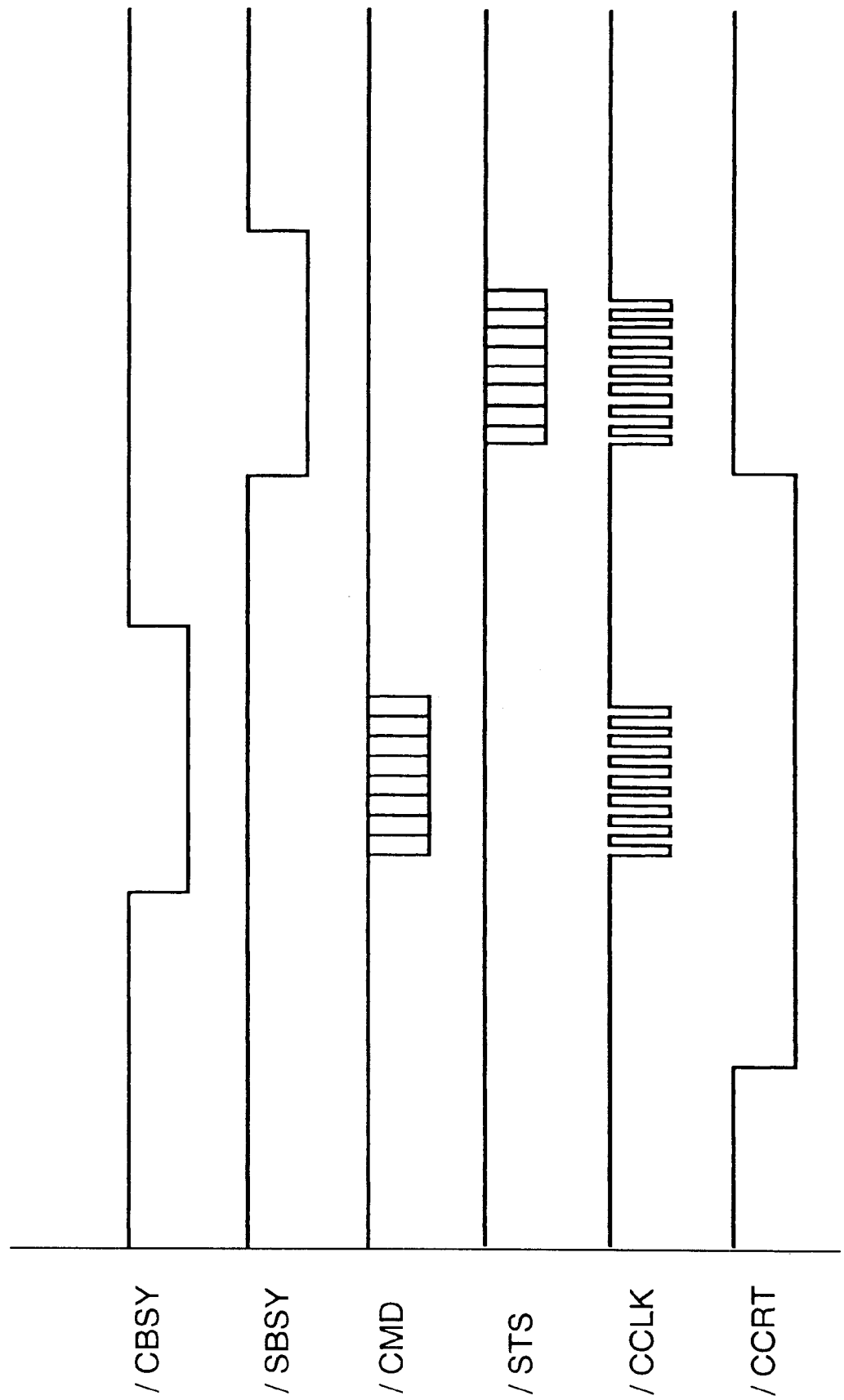
FIG. 6 is a timing chart of serial communication.

Exchange of commands and statuses by serial communication during printing will be described next. FIG. 6 shows the timing of communication between the printer controller and the engine control section.

A case wherein the /CCRT signal at the lowermost is not used will be described. When the printer controller wants to issue a command to the engine control section, the /CBSY signal is set at low (TRUE), and command data is sent as the /CMD signal in synchronism with the clock signal /CCLK. Upon receiving the command, the engine control section confirms that the /CBSY signal is at high (FALSE), then sets the /SBSY signal at low (TRUE), and sends status data as the /STS signal on the engine side corresponding to the command in synchronism with the /CCLK signal. The printer controller receives the status data and continues or interrupts print control in accordance with the status.

The /CCRT signal will be described. This signal goes low (TRUE) when the status on the engine side changes, which is designated by the printer controller in advance. For example, assume that the printer controller sets in advance using the /CMD signal such that the /CCRT signal is validated in case of "no paper". Assume that only one printing paper sheet remains, and the printer controller issues a print request for two sheets. For the first paper sheet, the print sequence is normally processed without any problem. However, the second printing paper sheet is not present. The printer engine side detects the change in status at the start of image formation for the second paper sheet and changes the /CCRT signal from high to low. This signal is transmitted to the printer controller. Upon detecting this signal, the printer controller immediately issues a command for requesting the feed section paper presence/absence status to the engine control section to know the feed cassette with "no paper". The engine control section returns the status of the "no paper" cassette to the controller side. The /CCRT signal is cleared to high when the /SBSY signal for returning the status goes low.

Figure 7:
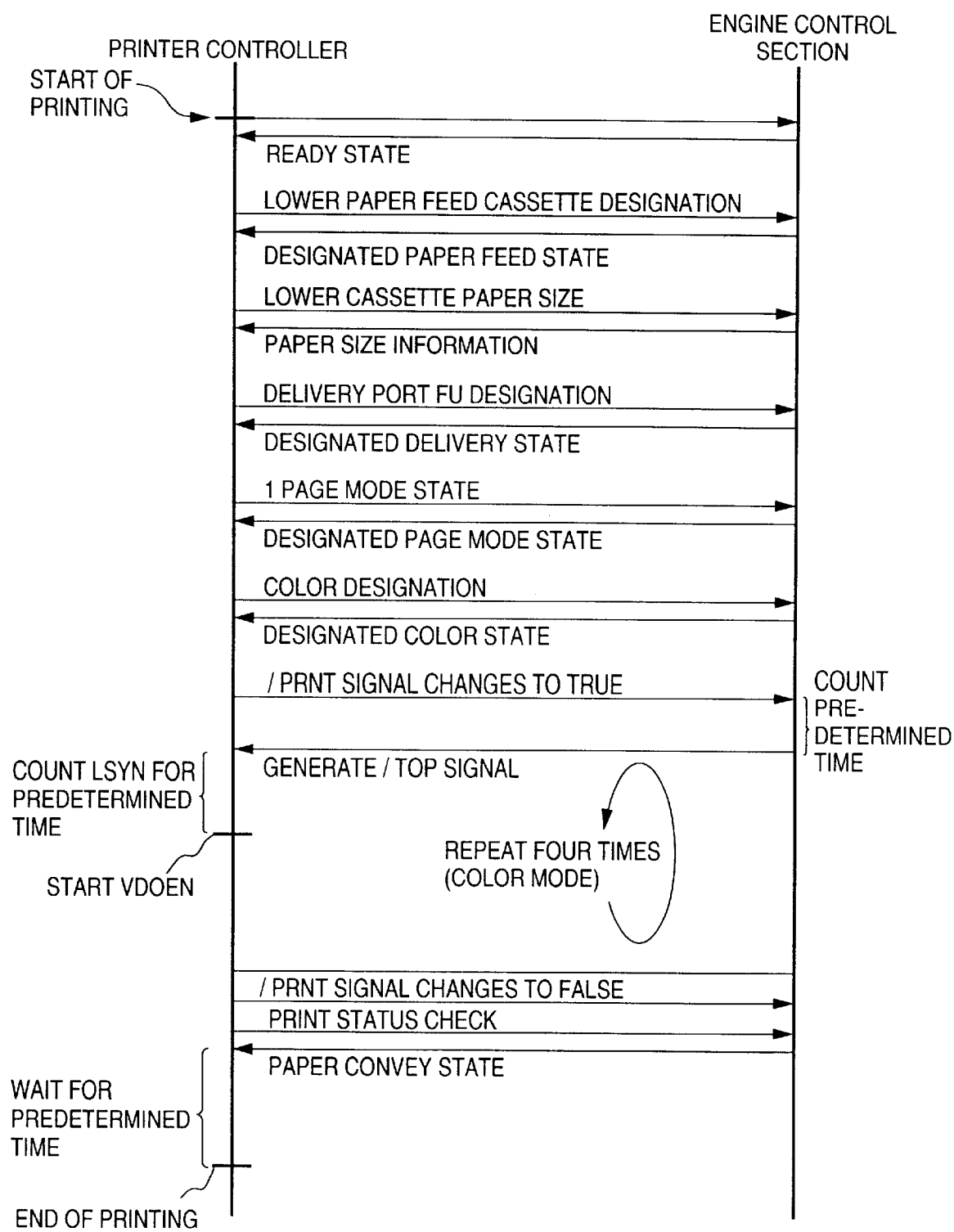
FIG. 7 is a view showing serial communication for printing.

The print operation will be described with reference to FIG. 7 that shows details of exchange of commands/statuses between the printer controller and the engine control section. This sequence assumes a color output.

When a print start request is generated, the printer controller checks the engine control section to check the ready state of the printer while converting image data. Next, the printer controller issues a command for designating the printing paper feed cassette and also a command for requesting the printing paper size of the designated cassette. The engine control section returns statuses corresponding to the series of commands.

The delivery port is determined by a command for designating the delivery port. A page mode designation command for designating the number of pages of image formation is issued. Finally, a command for monochrome or color is issued, thereby ending all setting operations on the printer side.

After that, the printer controller generates the print request /PRNT signal to the engine control section. The engine control section counts a predetermined time and returns the /TOP signal in response to the /PRNT signal. The printer controller transfers the image to the engine control section as the /VDO signal in synchronism with the /VCLK signal while synchronizing the vertical scanning direction with the /TOP signal and the horizontal direction with the /LSYNC signal. In this example, the color mode is set. Hence, the /TOP signal is generated four times to form four images of CMYK colors.

After the final /TOP signal is generated, the /PRNT signal is returned to high (FALSE). The engine control section detects that the print request is ended and shifts to post-processing such as cleaning of the intermediate transfer member. The printing paper sheet having the transferred image passes the fixing roller and is delivered to the designated delivery port. Finally, the printer controller confirms that the engine control section is not in the printing paper: convey state (end of delivery) and ends printing. The printer controller waits for the next print request in the ready state.

If an illegal state such as printing paper jam, above-described "no paper", or "door open" by the user occurs during the above operation, the engine control section immediately notifies the printer controller of the abnormality of the printer using the above-described /CCRT signal. The printer controller takes a measure corresponding to the abnormality.

Processing performed between the printer controller and the printer (engine control section) has been described above.

FIG. 16 is a schematic view of the printing apparatus having the above-described electrical arrangement. Referring to FIG. 16, reference numeral 2001 denotes the printer main body; 2002, the DC controller for controlling paper conveyance in the printer or image formation; and 2003, the image formation section. The printer controller 2103 shown in FIG. 17 is incorporated in the printer main body 2001, as shown in FIG. 16. The host computer 2104 is connected to the printer controller 2103 in a one-to-one correspondence or through the network 2105, as shown in FIG. 16. Reference numeral 2004 denotes the optional paper feed cassette deck; 2005, the optional sorter; and 2006, the option controller for controlling the optional cassette deck and optional sorter.

[Arrangement with Reader Controller]

Figure 8:
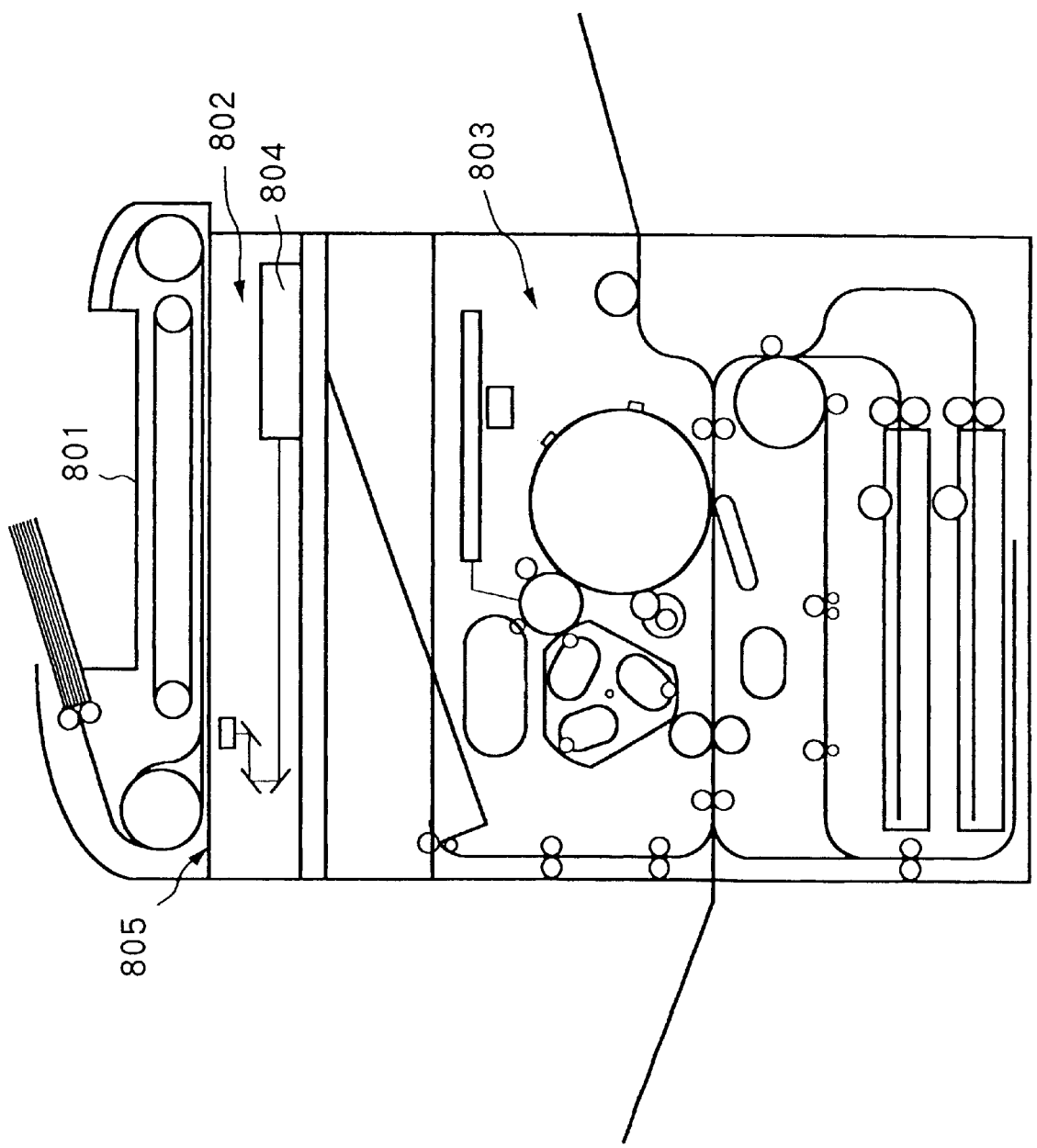
FIG. 8 is a view showing the outer appearance of an image forming apparatus having a reader section.

FIG. 8 is a view showing the outer appearance of the above-described printing apparatus having a reader controller which not only outputs image data output from the printer controller on the basis of data transferred from the computer but also optically reads an original image on paper, converts the image into a digital signal, and outputs the signal.

Reference numeral 801 denotes an original feeding unit for conveying an original to an optical reading section; 802, an optical reading unit; and 805, an original table glass. The original feeding unit is driven in synchronism with the optical reading unit. When an original image is conveyed onto the original table glass by the feeding unit 801, the optical reading unit scans the image while moving in the horizontal direction of FIG. 8 and sends reflected light that is appropriately optically processed to a photoelectric conversion section 804. Reference numeral 803 denotes a printer main body.

FIG. 9 is a view showing the electrical connection when the reader controller for reading an original image is added to the arrangement shown in FIG. 2 that shows the connection between the printer controller and the engine control section. FIG. 9 best illustrates the contents of the present invention. A reader controller 901 is arranged at the electrical intermediate point between the printer controller 2103 and the engine control section 2002 in FIG. 2. The signal lines between the printer controller 2103 and the reader controller 901 and between the engine control section 2002 and the reader controller 901 have the same functions as those shown in FIG. 2. However, since the signals between the printer controller 2103 and the reader controller 901 are physically different from those between the engine control section 2002 and the reader controller 901, C is added to the former signals, and P is added to the latter signals for discrimination.

Reference numeral 902 denotes an image signal processing section. An original scanning optical system control section 903 controls the optical reading unit 802. An original feed control section 904 controls the original feeding unit 801. Reference numeral 905 denotes an operation section; and 906, an image input section. An image signal converted by the photoelectric conversion section 804 is input from the image input section and transferred to the image signal processing section 902 in the reader controller 901.

Figure 18:
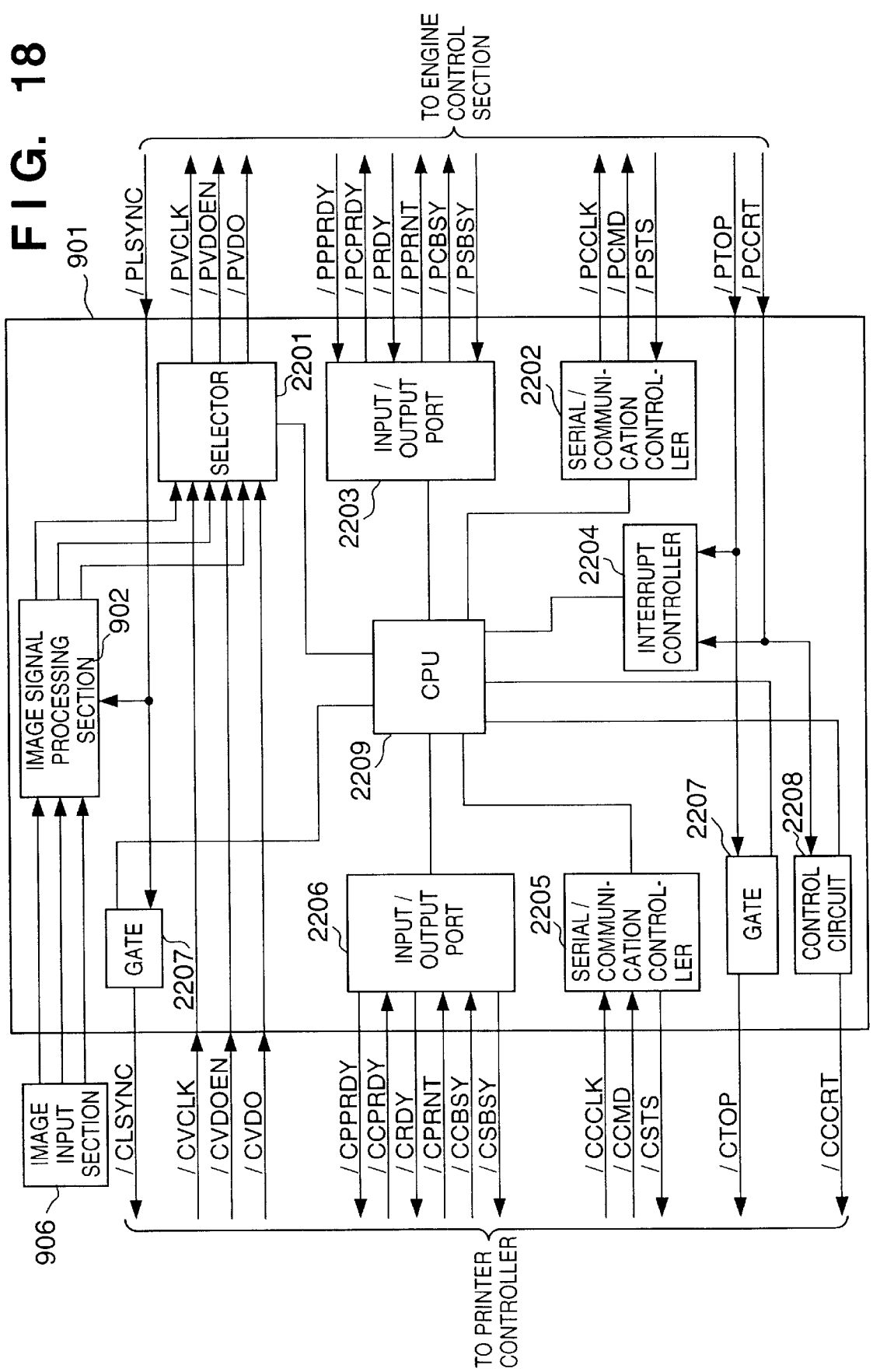
FIG. 18 is a block diagram showing the detailed arrangement in the reader controller.

FIG. 18 is a block diagram showing the arrangement in the reader controller.

Referring to FIG. 18, reference numeral 901 denotes the reader controller shown in FIG. 9; 902, the image signal processing section; and 906, the image input section. A selector 2201 selects outputs from the image signal processing section or signals sent from the printer controller 2103 and outputs the selected signals to the engine control section 2002. Three signals, i.e., the image clock signal /VCLK, video enable signal /VDOEN, and image data /VDO are switched by the selector.

A serial communication controller 2202 communicates with the engine control section 2002. An input/output port 2203 exchanges signals for compensating for communication by the communication controller. Reference numeral 2204 denotes an interrupt controller. An image top-of-page request signal /PTOP and printer status change signal /PCCRT are input to the interrupt controller. A serial communication controller 2205 communicates with the printer controller. An input/output port 2206 exchanges signals for compensating for communication by the communication controller. A gate 2207 controls whether a signal sent from the printer is to be sent to the printer controller. This gate is controlled by the image top-of-page request signal /TOP and line sync signal /LSYNC. A control circuit 2208 having a gate function and flag set function controls the printer status change signal /CCRT. The gate is ON/OFF-controlled to transmit the printer status change signal /CCRT issued by the engine control section to the printer controller. When a flag is set, the printer status change signal /CCRT can be issued from the reader controller to the printer controller. A CPU 2209 controls the entire apparatus.

[Copying Operation]

Processing of reading a full-color original image using these units and outputting it from the image forming apparatus will be described. When a copy start key (not shown) on the operation section 905 is pressed, the reader controller 901 closes the gate section 2207 and signal control circuit 2208. and sets the selector 2201 to select the outputs from the image signal processing section 902 for the copy mode.

Next, the engine control section is checked to check the ready state signal /PRDY of the printer using the input/output port 2203. Various setting operations are performed using the serial communication controller 2202.

A command for designating the printing paper cassette is issued first. In addition, a command for requesting the printing paper size in the designated cassette is issued. The engine control section returns statuses in correspondence with the series of commands.

Next, the delivery port is determined by a command for designating the delivery port, and a page mode designation command for designating the number of pages of images to be formed is issued. Finally, a command for designating monochromatic or color printing is issued, thereby ending all setting operations on the printer side.

After the original feeding unit 801 feeds an original to the original table, the reader controller sends a print request signal /PPRNT to the engine control section. In response to this, the engine control section returns the signal /PTOP after a predetermined time. This signal is processed by the interrupt controller 2204, and the optical reading unit 802 is operated in synchronism with the /PTOP signal. The signal input from the photoelectric conversion section 804 to the image signal processing section 902 is transferred to the engine control section while synchronizing the vertical direction with the /PTOP signal, the horizontal direction with the /PLSYNC signal, and the /PVDO signal with the /PVCLK signal. Since the color mode is set, the optical reading unit 802 is operated four times. The /PTOP signal is generated four times to form four images of CMYK colors.

After the final /PTOP signal is generated, the /PPRNT signal is returned to high (FALSE). The engine control section detects that the print request is ended and shifts to post-processing such as cleaning of the intermediate transfer member. The printing paper sheet having the transferred image passes the fixing roller and is delivered to the designated delivery port. Finally, the reader controller confirms that the engine control section is not in the printing paper convey state (end of delivery) and ends printing. The reader controller waits for the next print request in the ready state.

[Printing Operation]

A method of outputting an image from the printer controller 2103 from the image forming apparatus using these units will be described. When the copying operation is ended, the reader controller is set in the ready state. At this time, the reader controller opens the gate section 2207 and signal control circuit 2208 for printing. The reader controller checks the engine control section to check the printer ready state signal /PRDY using the input/output port 2203. If OK, the input/output port 2203 sets the printer ready state signal /CRDY in the printer controller using the input/output port 2206.

Next, the printer controller communicates to perform various setting operations. The reader controller receives the commands using the serial communication controller 2205, and the CPU 2209 interprets them. In accordance with the contents of the commands, the reader controller performs various setting operations using the serial communication controller 2202. The engine control section returns corresponding statuses to the reader controller, and the reader controller receives them using the serial communication controller 2202. The received contents are interpreted by the CPU 2209 and sent to the printer controller using the serial communication controller 2205.

Next, the printer controller 2103 sends the print request signal /CPRNT to the reader controller 901. The reader controller receives this signal and sends the print request signal /PPRNT to the engine control section. In response to this, the engine control section returns the /PTOP signal after a predetermined time. The gate control section 2207 passes this signal and returns it to the reader controller as the /CTOP signal. The reader controller 901 transfers the /CVDO signal to the reader controller in synchronism with the /CVCLK signal while synchronizing the vertical scanning direction with the /CTOP signal and the horizontal direction with the /CLSYNC signal as the /CLSYNC signal that has passed through the gate control section 2207. In the reader controller, the selector 2201 selects the signals sent from the controller. The signals sent from the controller are sent to the engine control section as the signals /PVCLK, /PVDOEN, and /PVDO.

[Difference Between Printing Operation and Copying Operation]

The difference between the printing operation and the copying operation will be described in association with the image sending timing.

A detailed description of the arrangement of the printer controller 2103 will be omitted. The printer controller 2103 has an internal image memory where image data to be printed is prepared in advance. Hence, the time required after the image top-of-page request signal /TOP is sent from the engine control section until the print data /VDO can be output is only the electrical delay time.

Figure 20:
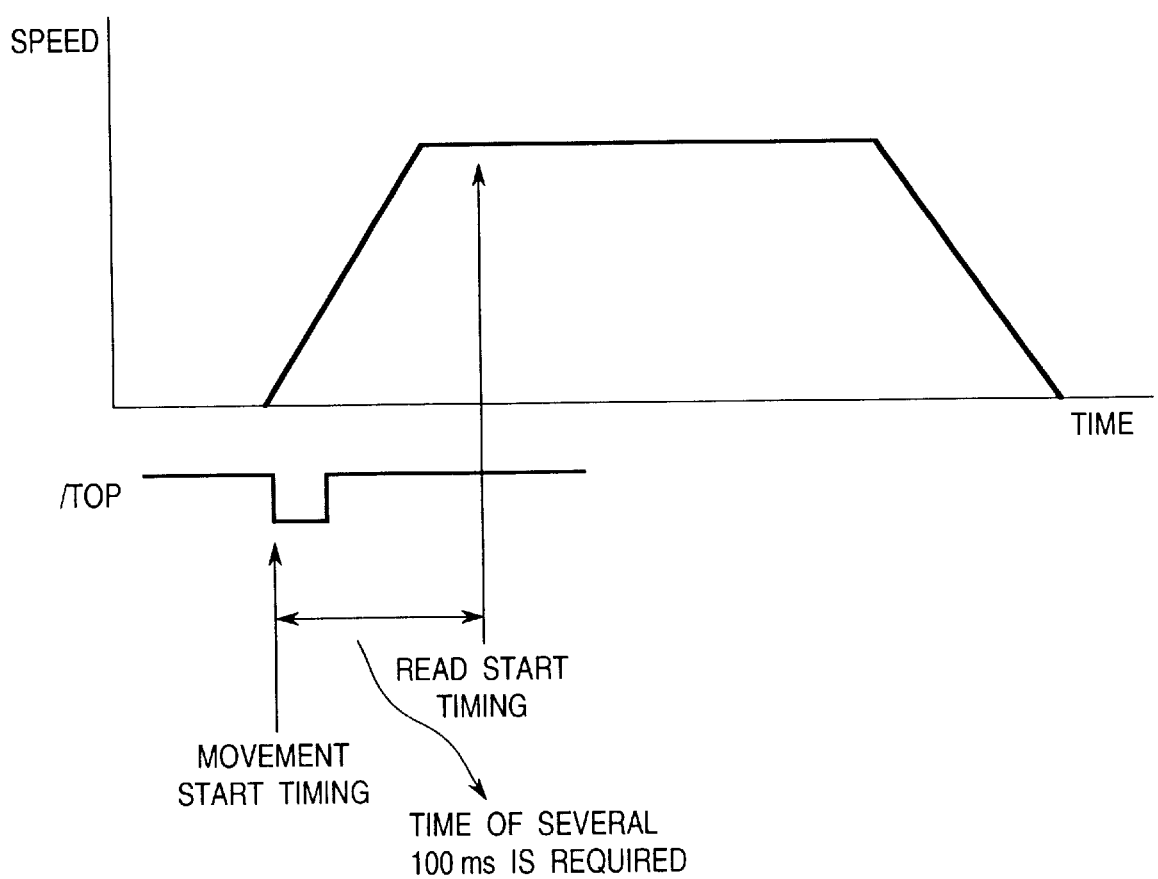
FIG. 20 is a graph showing the timing difference between copying and printing.
Figure 21:
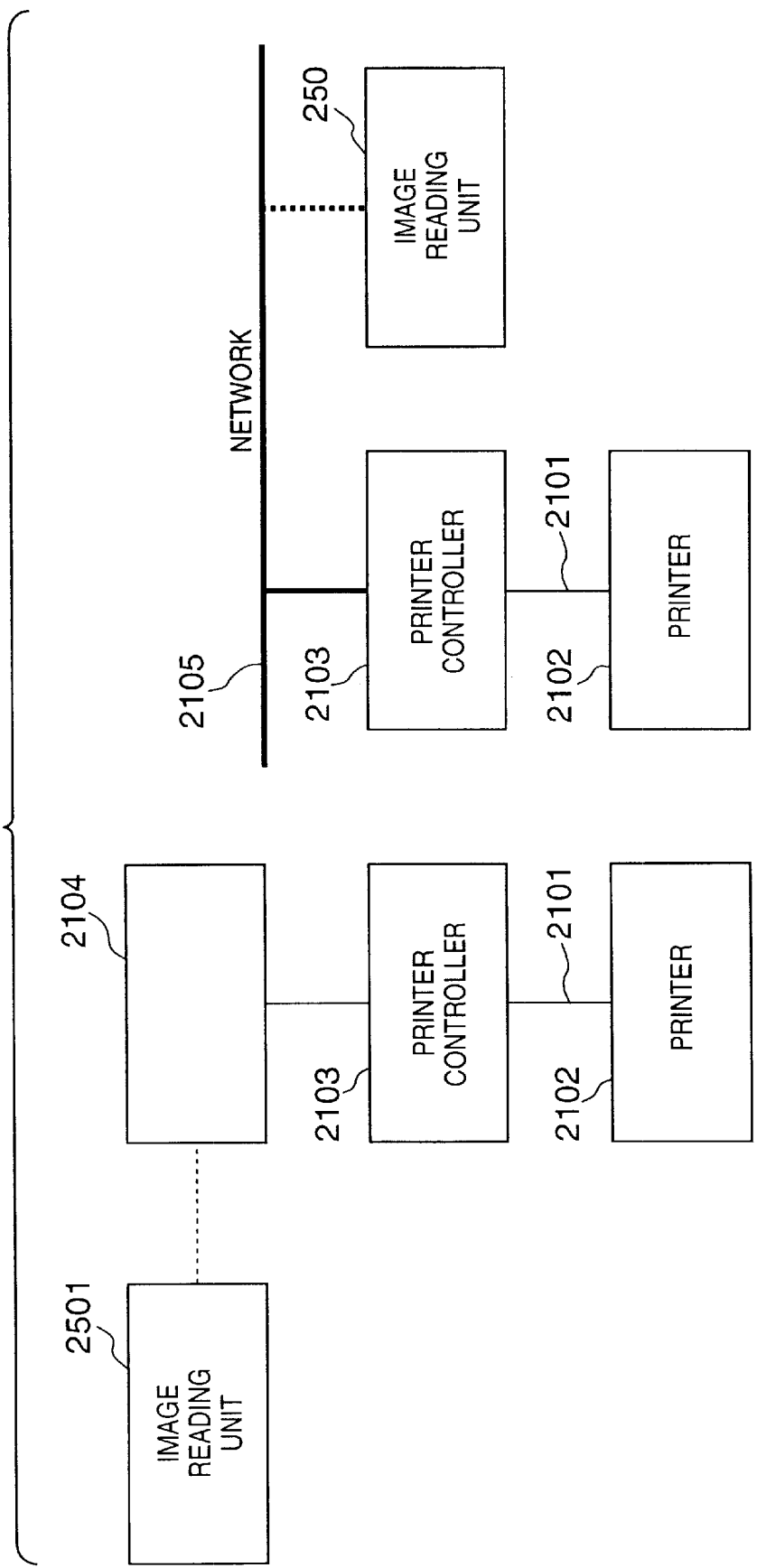
FIG. 21 is a view showing a way of attaching a conventional reader.
Figure 22:
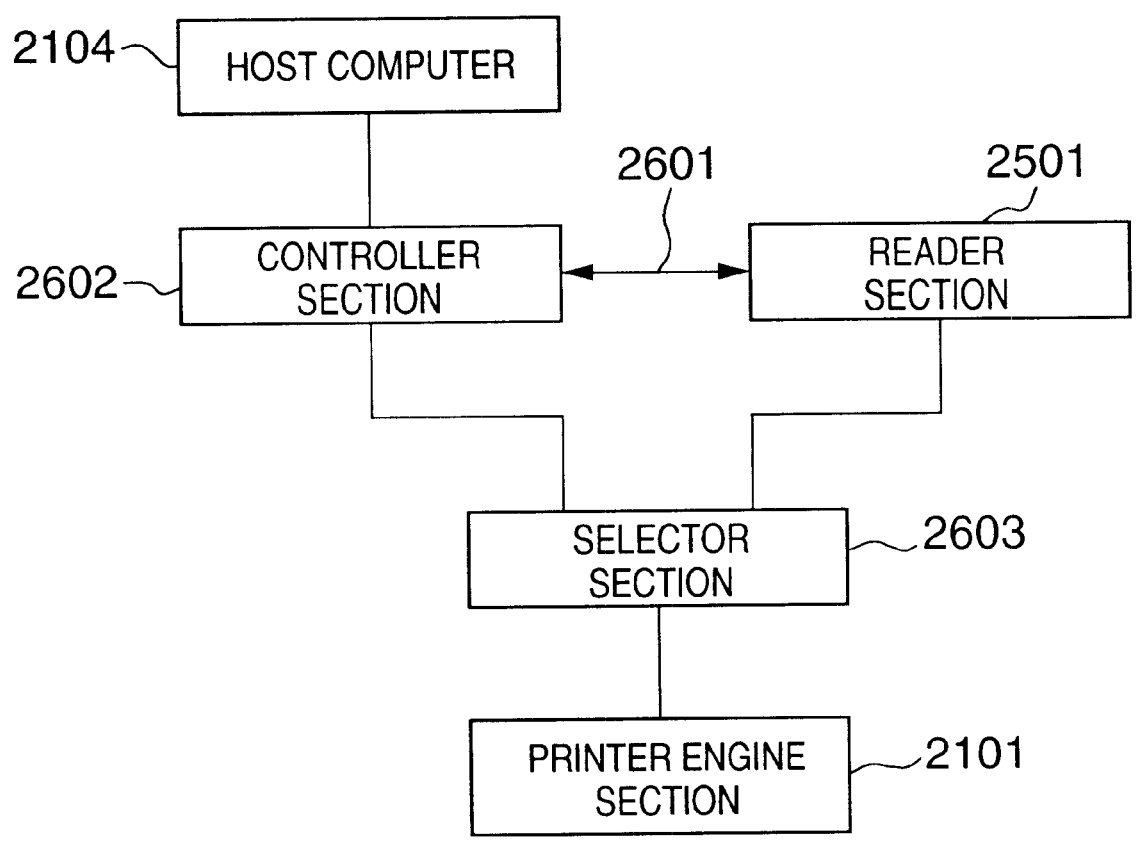
FIG. 22 is a view showing another way of attaching the conventional reader.

In the copy mode, however, an original is read, and image data is output while moving the optical reading unit 802. As shown in FIG. 20, an acceleration time is required to shift the reading unit from the stop state to the high-speed moving state for original reading. For example, a time of about several hundred ms is necessary. If the engine control section sends the image top-of-page request signal /TOP in the copy mode at the same timing as that in the print mode, the print image data /VDO arrives at the engine with a delay time of several hundred ms in the copy mode. Two measures against this delay are available.

1. The /TOP signal is sent earlier in the copy mode than in the print mode.

2. A signal (RSTART) dedicated for the copy mode is prepared.

For the first measure, the reader controller having the arrangement shown in FIG. 18 can be directly used. In the copy mode, the reader controller 901 starts moving the optical reading unit in accordance with the /TOP signal.

Figure 19:
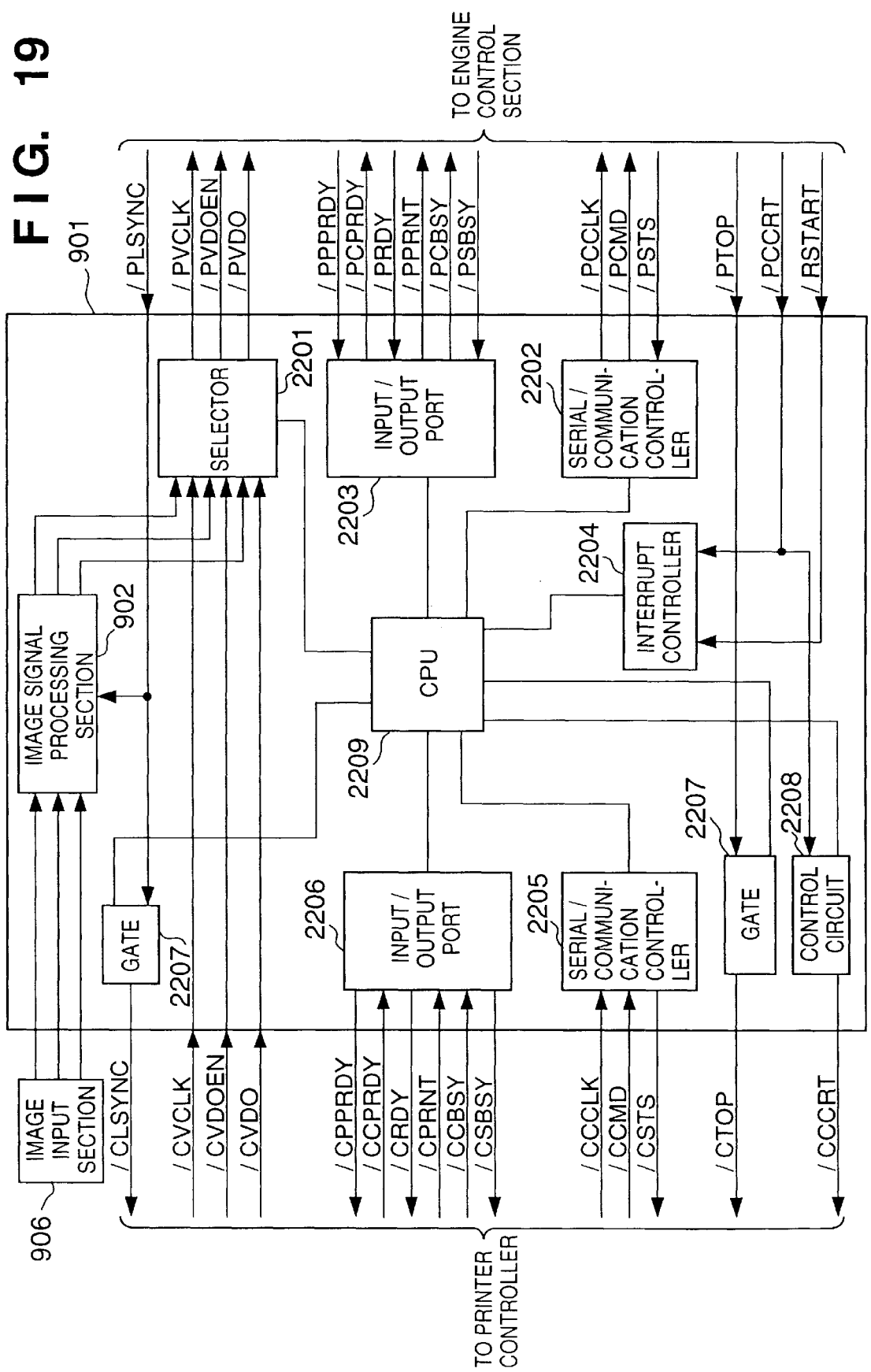
FIG. 19 is a block diagram showing the detailed arrangement in the reader controller.

For the second measure, an arrangement shown in FIG. 19 is used. The image top-of-page request signal /PTOP sent from the engine control section is necessary only when the printer controller performs printing, and need not be input to the interrupt controller of the reader controller. In addition, the reading unit moving start request signal /RSTART sent from the engine control section is necessary only in the copy mode, and need not be sent to the printer controller.

[Control of Setting Command]

The characteristic control of the present invention will be described below.

When the reader controller 901 is inserted between the printer controller 2103 and the engine control section 2002, communication between the printer controller and the engine control section is performed in the following way.

A case wherein when the reader controller reads an original image and. outputs it using the engine control section (copy mode), the printer controller 2103 issues a setting command, e.g., a paper feed cassette change command to the printer will be described.

FIGS. 10A and 10B are flow charts showing the command issue sequence in the arrangement without the reader controller, i.e., the arrangement shown in FIG. 2. FIG. 10A shows the processing sequence in the printer controller, and FIG. 10B shows the processing sequence in the engine control section. The printer controller issues the paper feed cassette change command (S1010) and waits for a response from the engine control section (S1020). When a response is received, the printer controller determines whether the command is successful, and ends the series of command issue sequences (S1030).

The engine control section receives the command from the controller and determines the contents of the command (S1040). When the command is the paper feed cassette change command, after the cassette is successfully changed (S1050), the printer controller is notified that the command is successfully executed (S1060).

Figure 11A:
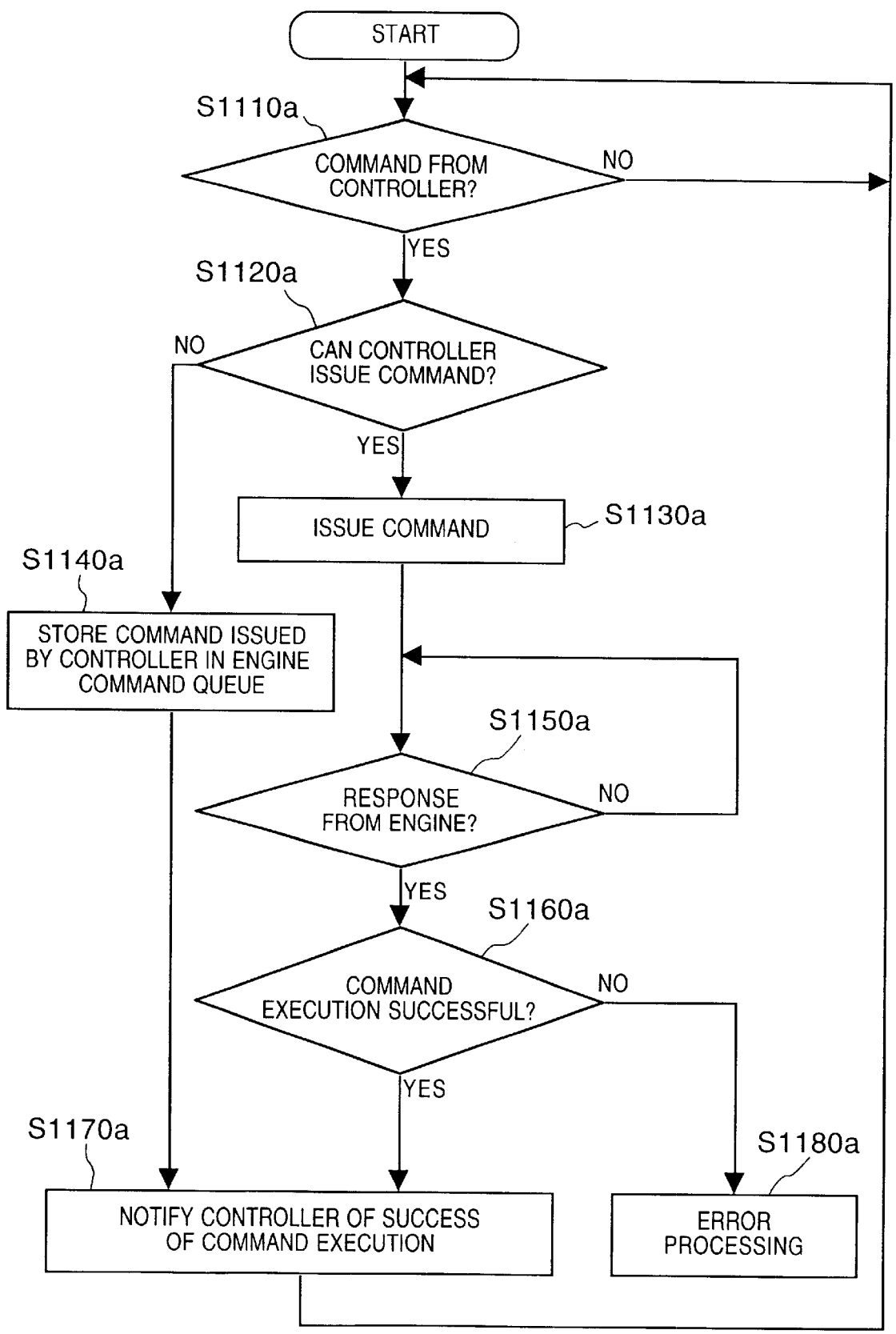
FIG. 11A is a flow chart showing the processing sequence of control for receiving a command from the printer controller and returning the status to the printer controller.
Figure 11B:
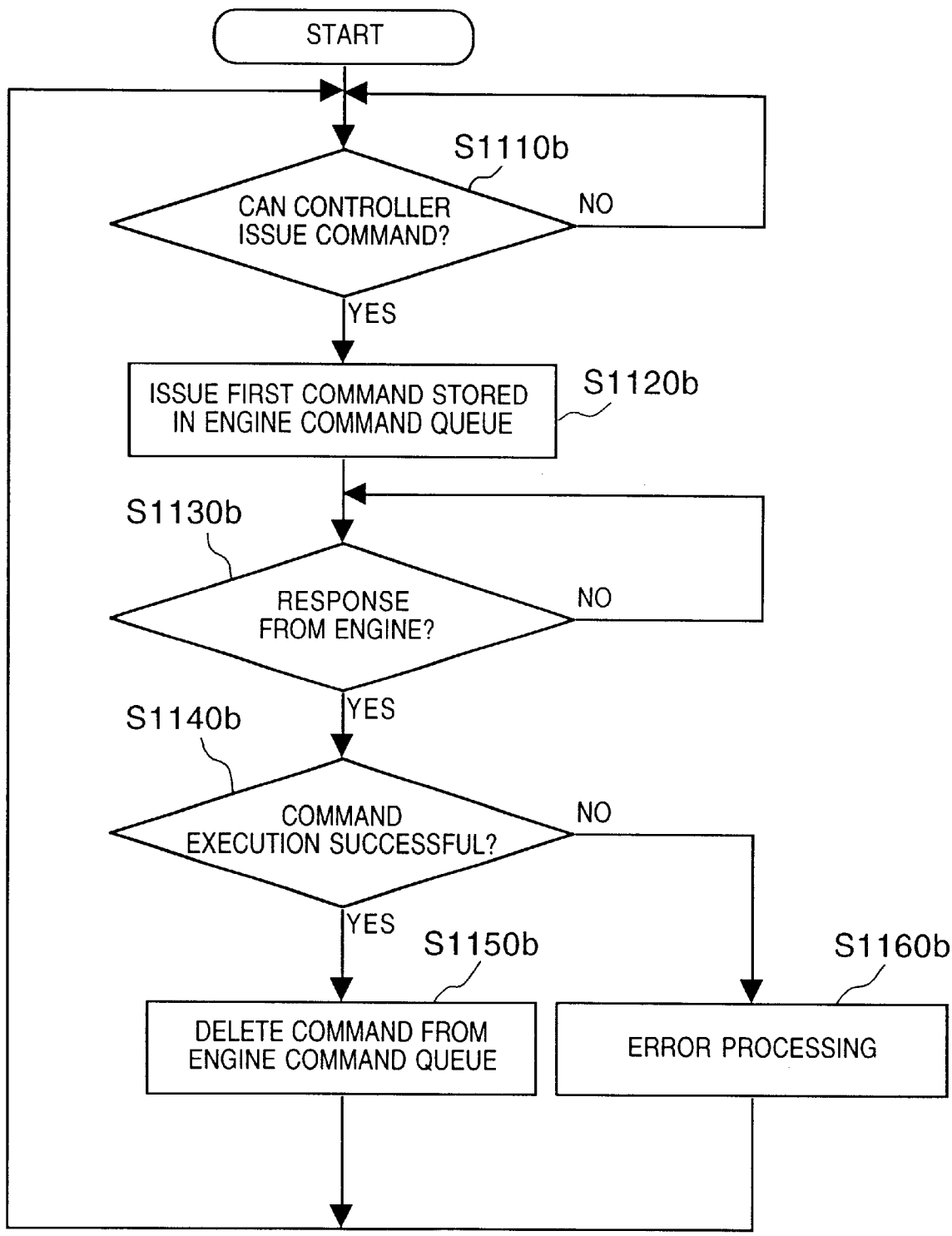
FIG. 11B is a flow chart for explaining processing when the command received from the printer controller can be issued to the engine control section.

FIGS. 11A and 11B are flow charts showing the control flow of the reader controller in the arrangement having the reader controller 901, i.e., the arrangement shown in FIG. 9. The printer controller and engine control section perform the same control operations as in FIGS. 10A and 10B.

FIG. 11A shows the flow of reception of a command from the printer controller and control for returning a status to the printer controller.

The reader controller receives a command from the printer controller by the serial communication controller 2205 through the /CCMD signal line shown in FIG. 9 (S1110a) and determines whether the command can be presently directly issued to the engine control section 2002 (S1120a). When no instruction is being executed by the engine control section for the copy mode, the reader controller issues the same command as that sent from the printer controller to the engine control section using the serial communication controller 2202 through the signal line /PCMD (S1130a).

Assume that the copying operation is being performed using a paper feed cassette designated by the reader controller. If the paper feed cassette change command sent from the printer controller is directly issued to the engine control section, the copying operation may fail. In this case, the command to be issued from the printer controller to the engine control section is stored in the engine command queue where commands are issued in the order of issue (S1140a).

A response to the command must be returned to the printer controller 2103. Hence, a pseudo response representing that the command is successfully executed is returned from the reader controller 901 to the printer controller using the serial communication controller 2205 through the /CSTS signal line (S1170a).

Processing performed when the reader controller 901 can issue the command received from the printer controller to the engine control section without any influence on its own state (control performed for the engine control section is canceled) will be described next with reference to FIG. 11B.

The reader controller 901 issues the command stored in the engine command queue to the engine control section using the serial communication controller 2202 through the signal line /PCMD (S1120b) and waits for a response. A command issued by the reader controller itself is also transmitted to the engine control section through the /PCMD signal line. When command execution is ended, the engine control section returns a response to the reader controller through the /PSTS signal line (S1130b). When the command is successfully executed (S1140b), this command is deleted from the engine command queue (S1150b).

If it is determined at this time that the engine has failed to execute the command, an error generation state is processed (S1160).

As described above, even when the reader controller 901 is inserted between the printer controller 2103 and the engine control section 2002, the command processing sequence for normal command issue from the printer controller 2103 to the engine control section 2002 can be executed without any mismatching in operation.

[Control of Status Change Signal]

In the arrangement wherein the reader controller 901 is inserted between the printer controller 2103 and the engine control section 2002, processing when the engine control section notifies the reader controller of a status change on the engine side, e.g., an error generation state using the /PCCRT signal will be described next.

When the reader controller 901 is inserted, the status change that the reader controller side wants to know may be different from that on the printer controller side. For example, assume that a paper sheet which is being conveyed jams.

When the jam occurs when the engine control section 2002 is performing the copying operation under the control of the reader controller 901, only the reader controller wants to know this status. Even when the printer controller 2103 is notified of this status, it cannot execute appropriate post-processing because the jam has not occurred during the output operation of the printer controller itself.

When the same control system as that of the reader controller 901 is prepared on the printer controller side, each controller has jam processing control software for one another, resulting in a redundancy. This leads to a considerable waste in the design process, quality evaluation, and software capacity.

Basically, in the print mode, the printer controller 2103 is notified of the status, and in the copy mode, the reader controller 901 is notified of it.

However, even in the copy mode, the printer controller may need an engine status change signal. For example, information of a cassette size change or "no paper" must also be transmitted to the printer controller 2103. However, such information does not require a strict time after the status change signal is issued from the engine control section 2002 until processing is performed by each controller.

Figure 12:
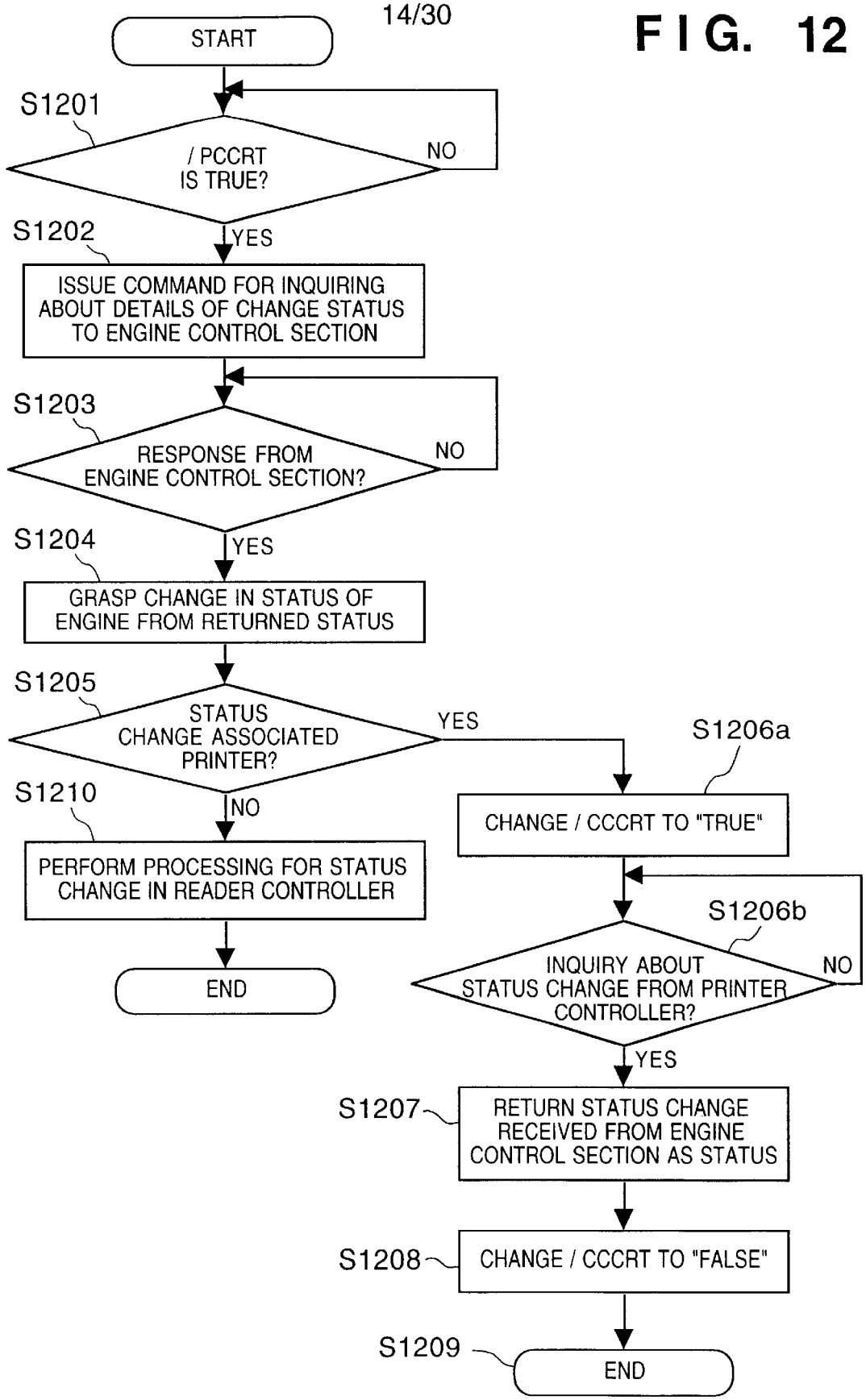
FIG. 12 is a flow chart showing processing for a change in state of a /CCRT signal when the reader is attached.

Processing to be described below is executed. In the copy mode wherein the reader controller 901 is controlling the engine control section 2002, the status change signal /PCCRT transmitted from the engine control section is masked to the printer controller 2103 using the gate function of the control circuit 2208 such that only the reader controller receives the signal through the interrupt controller 2204. The reader controller 901 performs processing in accordance with the control flow shown in FIG. 12.

When the /PCCRT signal becomes TRUE (S1201), the reader controller issues a command for acquiring a status change to the engine control section (S1202). The reader controller grasps the contents of the status change of the engine on the basis of a returned status. It is determined whether the printer controller also need be notified of the contents (S1203 and S1204).

For example, the printer controller need be notified that the paper feed cassette size has been changed. If it is determined that the printer controller need be notified of the status change (S1205-YES), a flag is set using the control circuit 2208, and the status change signal /CCCRT is generated (S1208) and sent to the printer controller.

In the print mode wherein the printer controller 2103 is controlling the engine control section 2002, the gate function of the control circuit 2208 is opened to transmit the status change signal /PCCRT sent from the engine control section to the printer controller as the status change signal /CCCRT.

[Control of Execution Command]

Control of an execution command will be described next. For example, control by the reader controller when the printer controller and reader controller simultaneously issue use requests to the engine control section will be described.

Figure 13:
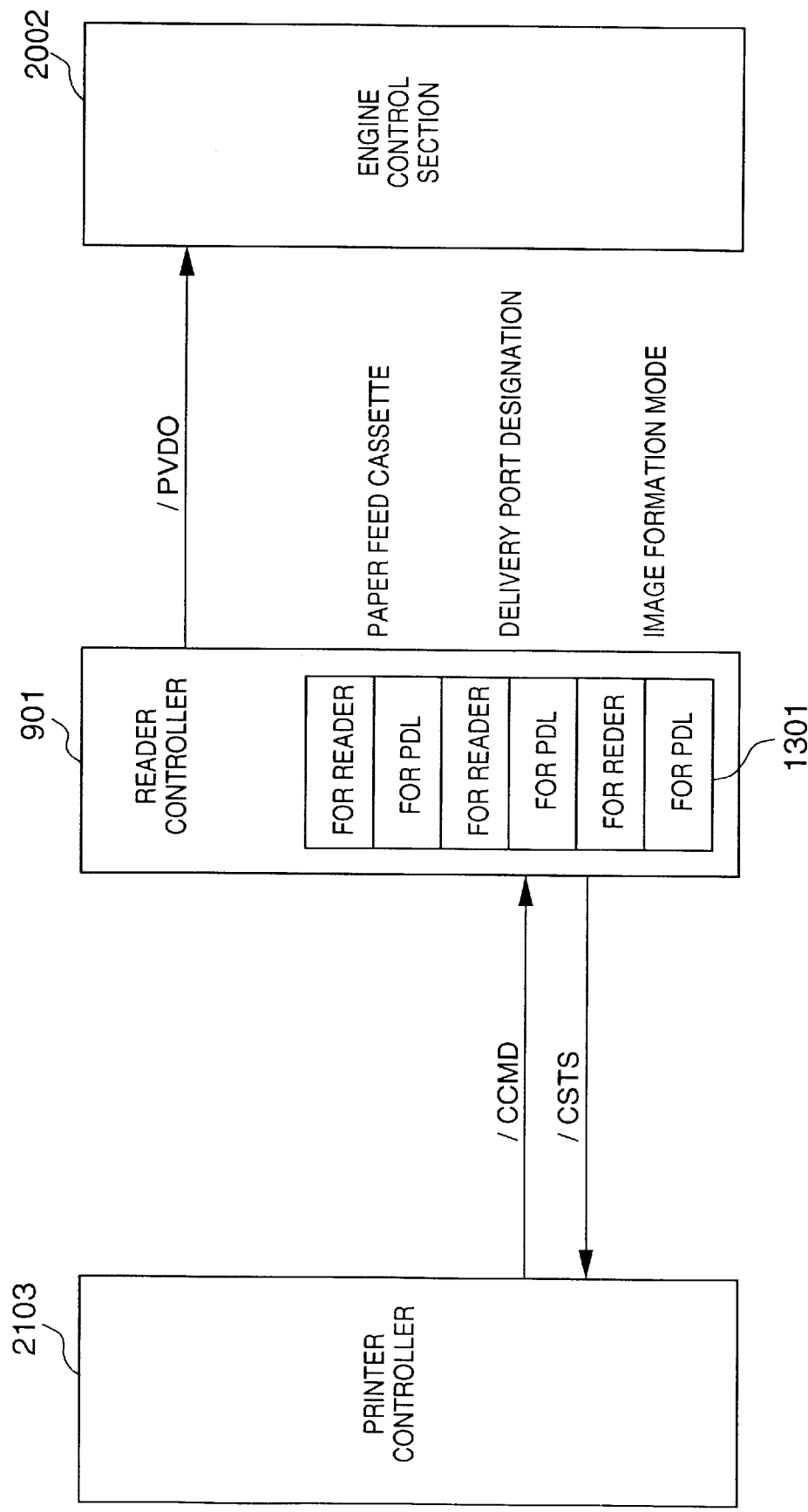
FIG. 13 is a view showing print request processing during the copying operation.

FIG. 13 is a view showing the positions and exchange of data when a print request is generated during the copying operation. At this time, the engine control section 2002 is receiving the image signal /PVDO sent from the reader controller 901 to form an image. For this operation, the paper feed cassette, delivery port, and image formation mode have already been set by serial communication between the reader controller and the engine control section, as described with reference to FIG. 7. A buffer 1301 for various set values store values set by the reader controller 901 itself in the engine control section 2002 and values set by the printer controller 2103 in the engine control section.

Of various set values stored in the buffer 1301, the above-described designation values are stored as set values for the reader. When a print request is generated from the printer controller during the copying operation, interrupt printout during the copying operation is unlikely from the viewpoint of usability. Hence, the print request under this circumstance is postponed until the copying operation is ended. However, the /CSTS signal must be returned in response to the /CCMD signal from the printer controller. To do this, of the set values in the buffer 1301, only the set values from the printer are set as set values for the PDL controller in accordance with the request. If the set values for the reader and those for the PDL controller are different from each other, the values are set from the reader controller to the engine control section before the start of printing. A specific example will be described below.

Assume that the copying operation is being executed in which paper sheets are fed from the upper cassette and delivered to the face-up delivery port, and the color mode is set as the image formation mode because it is determined that the original is a color original. When a print request is issued from the printer controller, execution of printing itself is postponed, though various setting operations can be performed. Assume that the print request designates to feed paper sheets from the upper cassette, deliver the sheets to the face-down delivery port, and output a monochromatic image. As the paper feed cassette, both the reader controller and printer controller designate the upper cassette. Hence, when the copying operation is ended and switched to the printing operation, no paper feed cassette designation command need be issued to the engine control section. However, different delivery ports and image formation modes are set for the copying operation and printing operation, respectively. For this reason, when the copying operation is ended, new commands for designating the delivery port and image formation mode must be issued from the reader controller to the engine control section.

As described above, the reader controller determines such that for a command from the printer controller, execution in the engine control section is postponed, and also determines such that values already set by the reader controller in the engine control section are not redundant.

A case wherein a copy request is generated during printing will be described next with reference to FIG. 14. Contrary to the case in FIG. 13, from the viewpoint of usability, when the copy button of the copying machine is pressed, an interrupt is preferably allowed to perform the copy operation rather than inhibition of the copying operation during printing.

In this case, the /CVDO signal sent from the printer controller is selected by the selector 2201 and sent to the engine control section as the /PVDO signal. Assume the same setting as described with reference to FIG. 13, i.e., that the printer controller has set the upper cassette, face-down delivery port, and monochromatic image mode. The engine control section can detect the end of printing for the first time when the /PPRNT signal from the printer controller changes to high (FALSE), and therefore does not know the number of images to be printed. In this example, assume that the printer wants to print four images. Unless an interrupt copy request is issued from the reader controller, four /PTOP signals are generated by the engine control section, and the images are sent from the printer controller to the engine control section through the reader controller in accordance with the signals.

Figure 15:
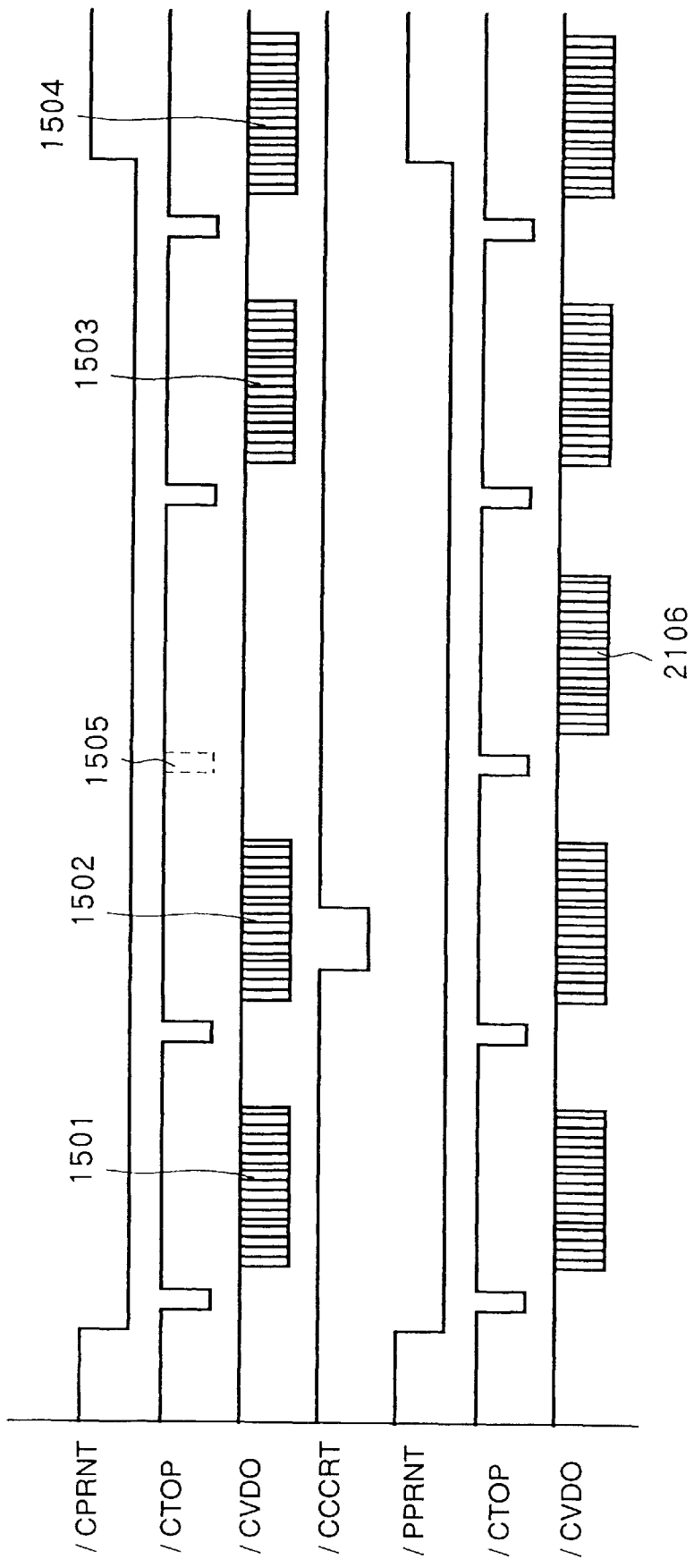
FIG. 15 is a timing chart of interrupt copy.

Assume that an interrupt copy request for requesting to copy one color image is generated to the reader controller during printing of the second image. This will be described with reference to FIG. 15. In accordance with the /CPRNT request from the printer controller, the reader controller issues the /PPRNT request to the engine control section. The /PTOP signal is supplied from the engine control section to the printer controller through the reader controller as the /CTOP signal. In this way, a first image 1501 and second image 1502 are printed.

A case wherein an interrupt copy request is generated by the reader controller during printing of the second image will be described. The reader controller sends the /CCCRT signal to the printer controller.

This signal does not notify that the engine status has actually changed. Instead, by this signal, the reader controller requests the printer controller to release the engine to acquire the printer engine. The signal is generated using the control section 2208, as described above. In accordance with the /CCCRT signal, the printer controller issues a command for checking the engine status. The reader controller accordingly returns a status "during copying" to the printer controller.

The printer controller detects that the engine is performing the copying operation and waits for the /CTOP signal while keeping the /CPRNT signal low (TRUE). If the engine is not in the copy state, and no /CTOP signal is received when the /CPRNT signal is kept low (TRUE), a time-out error occurs after a predetermined time. In the copy state, the printer controller sets such that the time-out is canceled to wait for the /CTOP signal permanently. The /PTOP signal sent from the engine control section is for the copying operation and therefore used on the reader controller side.

As indicated by reference numeral 1505, the /PTOP signal sent from the engine side is masked to the printer controller. The image signal actually generated by the reader controller is only an image signal 1506. When the interrupt copy of one image is ended, masking of the /PTOP signal is canceled again, and the /PTOP signal is sent to the printer controller as the /CTOP signal. Images 1503 and 1504 from the printer controller can be printed by the engine control section. The interrupt copying operation during printing can be realized by the above-described method.

In accordance with the states of the printer controller and reader controller, the reader controller determines and controls as needed the controller which should acquire the printer engine or the command issue timing. With this arrangement, requests from the two controllers to one engine can be realized.

[Characteristic Control]

As a characteristic feature of the present invention, control when a set content confirmation command is issued by the printer controller will be described next.

When the state set in the engine control section is to be confirmed by the printer controller, the printer controller issues a set content confirmation command through the /CCMD signal line. Upon receiving this command, the reader controller checks the set value storage buffer shown in FIG. 13. If the content to be confirmed by the printer controller is present in the buffer, the reader controller reads out the content and notifies the printer controller of it through the /CSTS signal line.

If the content is not present in the buffer, the reader controller issues the set content confirmation command through the /PCMD signal line. The engine control section reads out the content and notifies the reader controller of it through the /PSTS signal line. The reader controller notifies the printer controller of the content through the /CSTS signal line.

To increase the probability of presence of necessary data in the set value storage buffer contributes to reduce the communication amount. If it is determined that the necessary data is not stored in the storage buffer, and the status confirmation request command is issued from the printer controller, this influences the communication amount between the reader controller and the engine control section. This may not pose a serious problem when no print request is output from either controller to the engine control section. However, during operation, the load of the CPU increases. The CPU functions to control not only communication between the printer controller and the engine control section but also setting for image processing or a number of options including a document feeder, sorter, and finisher. For this reason, a progress of systematization results in an increase of the load of the CPU.

To prevent this, the probability of presence of data required by the printer controller in the storage buffer must be made as high as possible to prevent any excess increase in communication amount between the reader controller and the engine control section.

Figure 23:
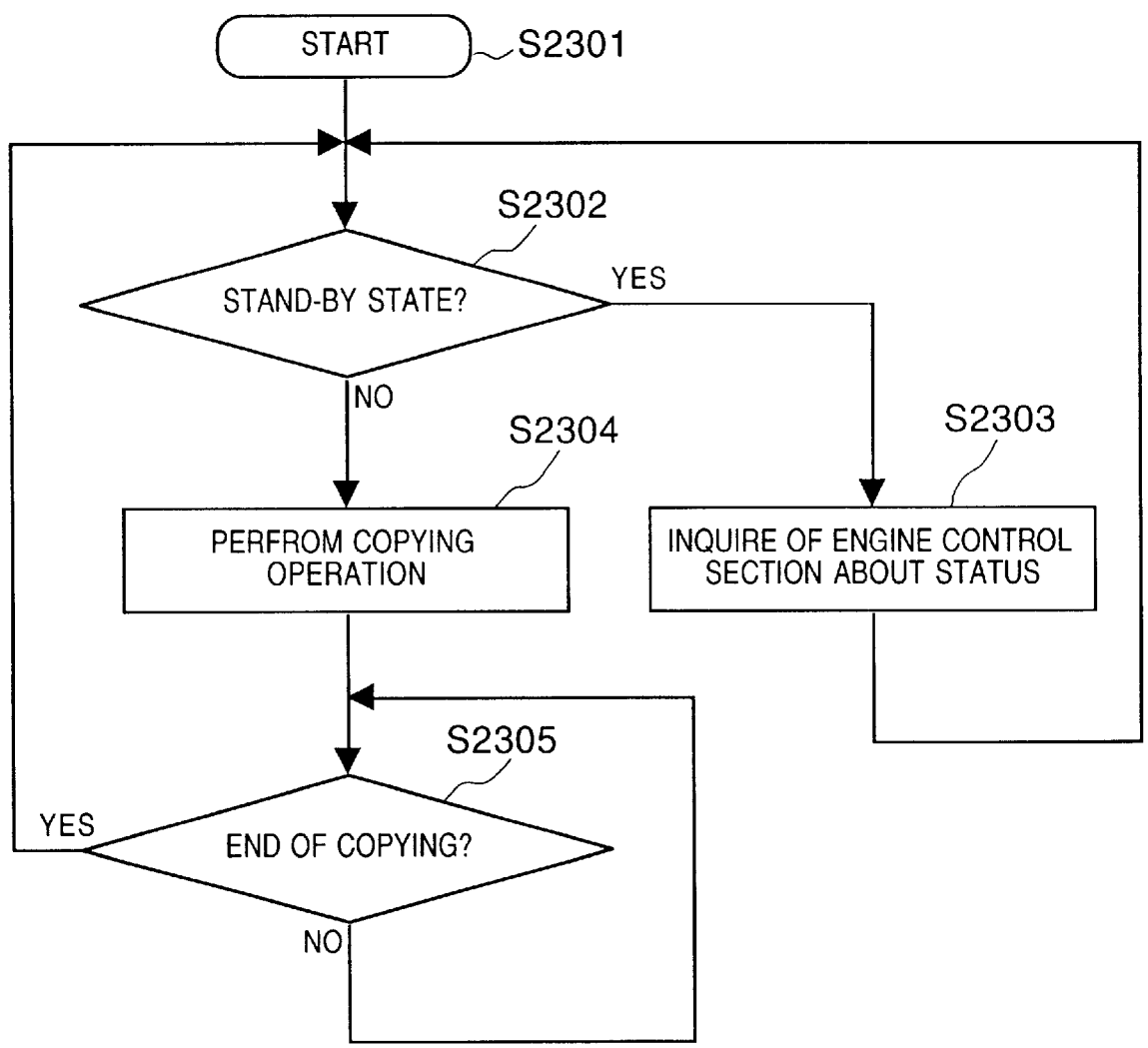
FIG. 23 is a flow chart showing the status monitor control flow.

For this purpose, in the stand-by state where the CPU load is small because no print request is issued from either reader controller or printer controller, a status content confirmation command is periodically issued to the engine control section even for a status that is not required by the reader controller, thereby always storing latest data in the set value storage buffer shown in FIG. 13. This processing flow will be described with reference to FIG. 23. When the power is turned on, initialization such as adjustment of the light source of the reader is ended, and initialization such as cleaning of the printer or density control is ended, the state in step S2301 is set. Next, it is determined the stand-by state is set (the CPU load is small) (S2302). If it is determined that the stand-by state is set, the engine control section is inquired about the status in step S2303.

If it is determined that the stand-by state is not set (e.g., during the copying operation), processing of inquiring about the status is stopped, and processing for the copying operation is performed in step S2304. The status is monitored until the copying operation is ended (S2305). When the copying operation is ended, the flow returns to step S2302 to repeat the above operation.

The method of inquiring about the status in step S2303 will be described in more detail. A status inquiry can be realized by polling at a predetermined time interval or using the above-described CCRT signal. For polling, an inquiry about all statuses is performed every predetermined time, and no detailed description thereof is necessary. A case wherein the CCRT signal is processed will be described.

When the CCRT. signal is to be validated, the status for which the engine control section generates the CCRT signal in case of a change must be set. For example, one of cases wherein, e.g., the paper size has been changed, the feed cassette or delivery port has been changed, no paper sheets are present anymore, and the error status has changed is selected for validation to determine the CCRT generation condition. Even when the reader controller requires the CCRT signal only when the error status has changed, other CCRT generation conditions are also set. In this case, the reader controller acquires the status as far as it is in the stand-by state independently of the status required by the printer controller. Hence, the printer controller can be notified of the status without inquiring of the engine control section about the status again.

Embodiment 2

The means for detecting the load state of the engine control section through the communication units will be described in more detail.

Figure 24:
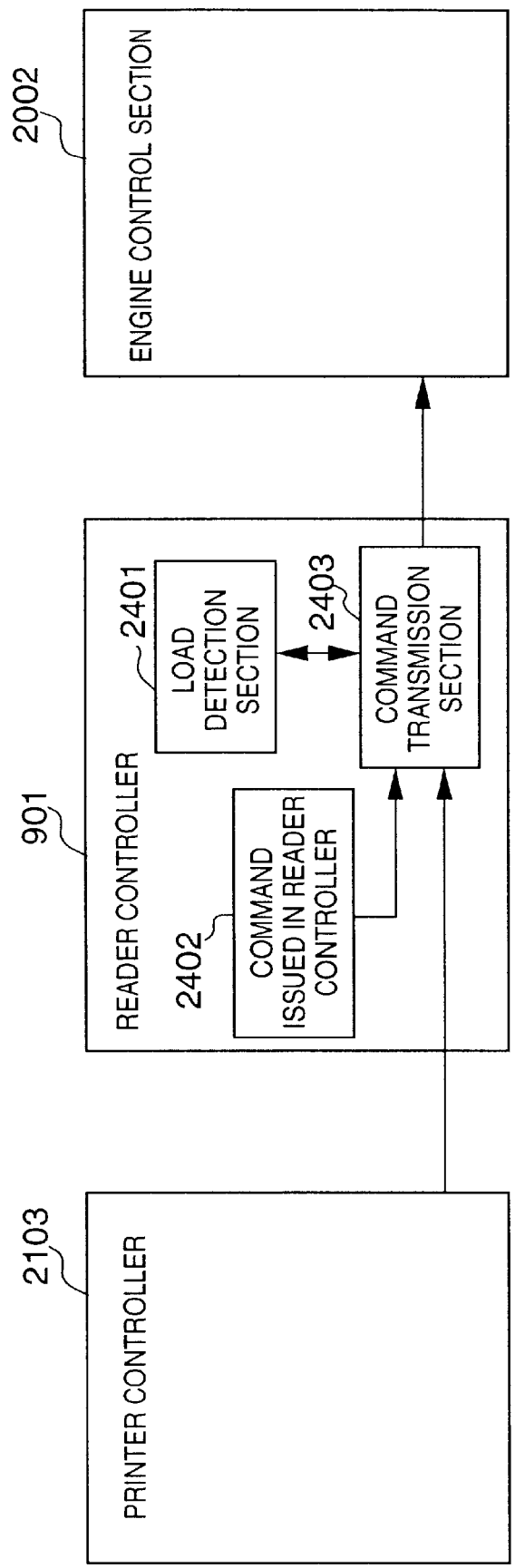
FIG. 24 is a block diagram showing for detecting the load state in the engine controller.

As shown in FIG. 24, the reader controller incorporates a load detection section 2401. The reader controller 901 receives, by a command transmission section 2403, a command issued from a printer controller 2103 and all commands issued from a reader controller 901 itself and sends a command to the engine control section 2002. At this time, when the load detection section 2401 looks up the internal state of the command transmission section 2403, the status of the communication units can be monitored, and the communication load state between the communication units and the engine control section 2002 can be detected.

Figure 25:
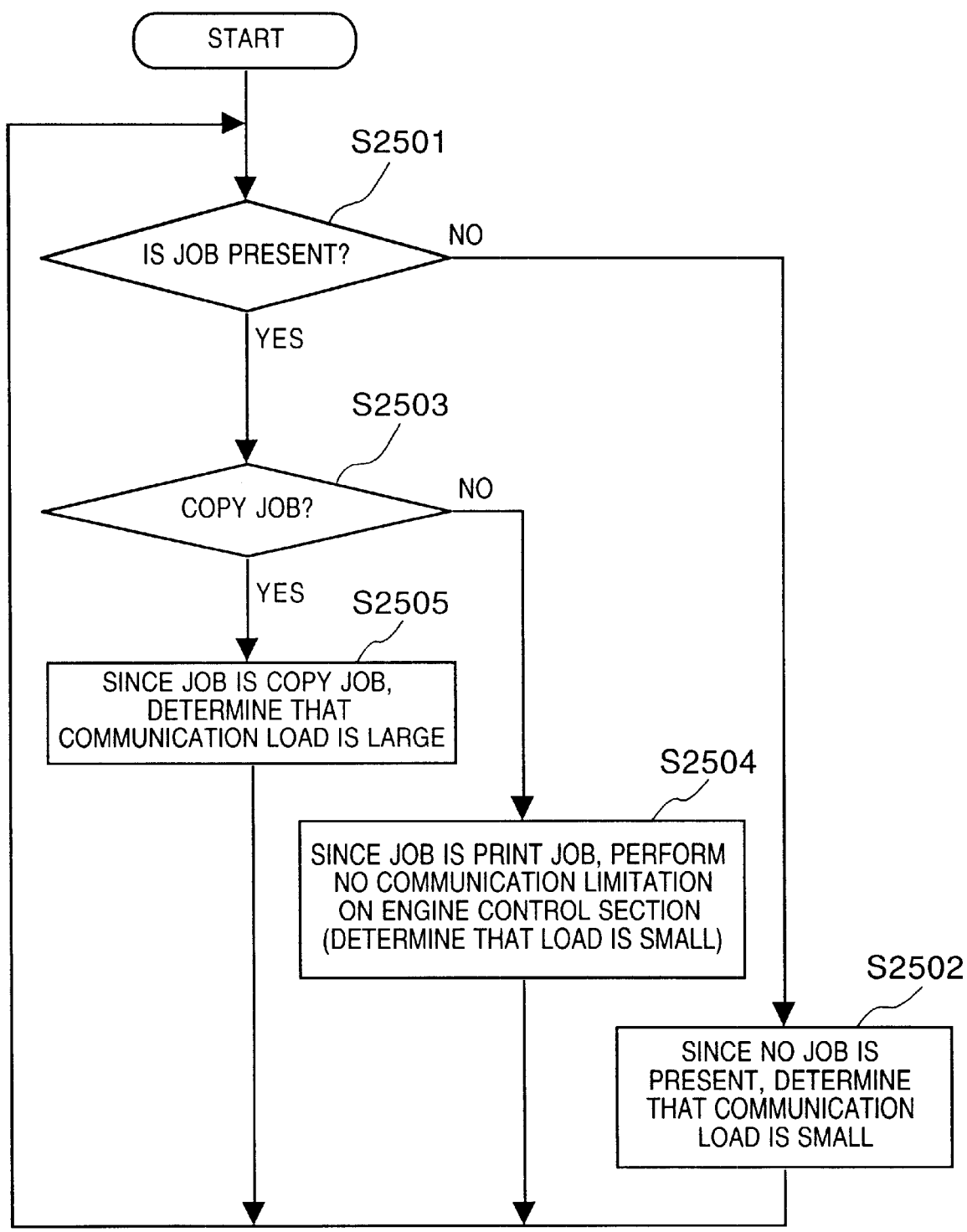
FIG. 25 is flow chart showing a case wherein whether a job is present is used as the determination criterion.

Details of control by the load detection section 2401 will be described next with reference to flow charts. FIG. 25 shows a case wherein whether a job is present is used as the determination criterion. The reader controller 901 can determine whether the system itself is performing the job operation or in the idle state. It is determined in step S2501 whether a job, a copy job or a printer job, is present at this time point. This determination can be done in accordance with the signal /PRNT on the communication line between the reader controller and the engine control section, which signal represents whether the engine is actuated. If this signal is "TRUE", the engine is actuated, i.e., a job is present. If "FALSE", it can be determined that no job is present.

When no job is present, and communication need not be performed at a severe timing during the operation of the engine, it is determined that the communication load is small. In this case, the engine control section can be periodically inquired about the status, as in S2303.

If it is determined in step S2501 that a job is present, the type of job is determined in step S2503. This determination can be done by monitoring the state of the selector of the command transmission section S2403.

When the job is a print job, the printer controller issues a necessary command as needed. In step S2504, it is determined that the load is small because no communication limitation on the engine control section is required.

When the job is a copy job, the reader controller itself must issue a command to the printer at a strict timing in synchronism with the copy sequence, and therefore, it is determined that the communication load is large.

For step S2505, details may be further switched in accordance with the frequency of the communication command (to be described later).

Figure 26:
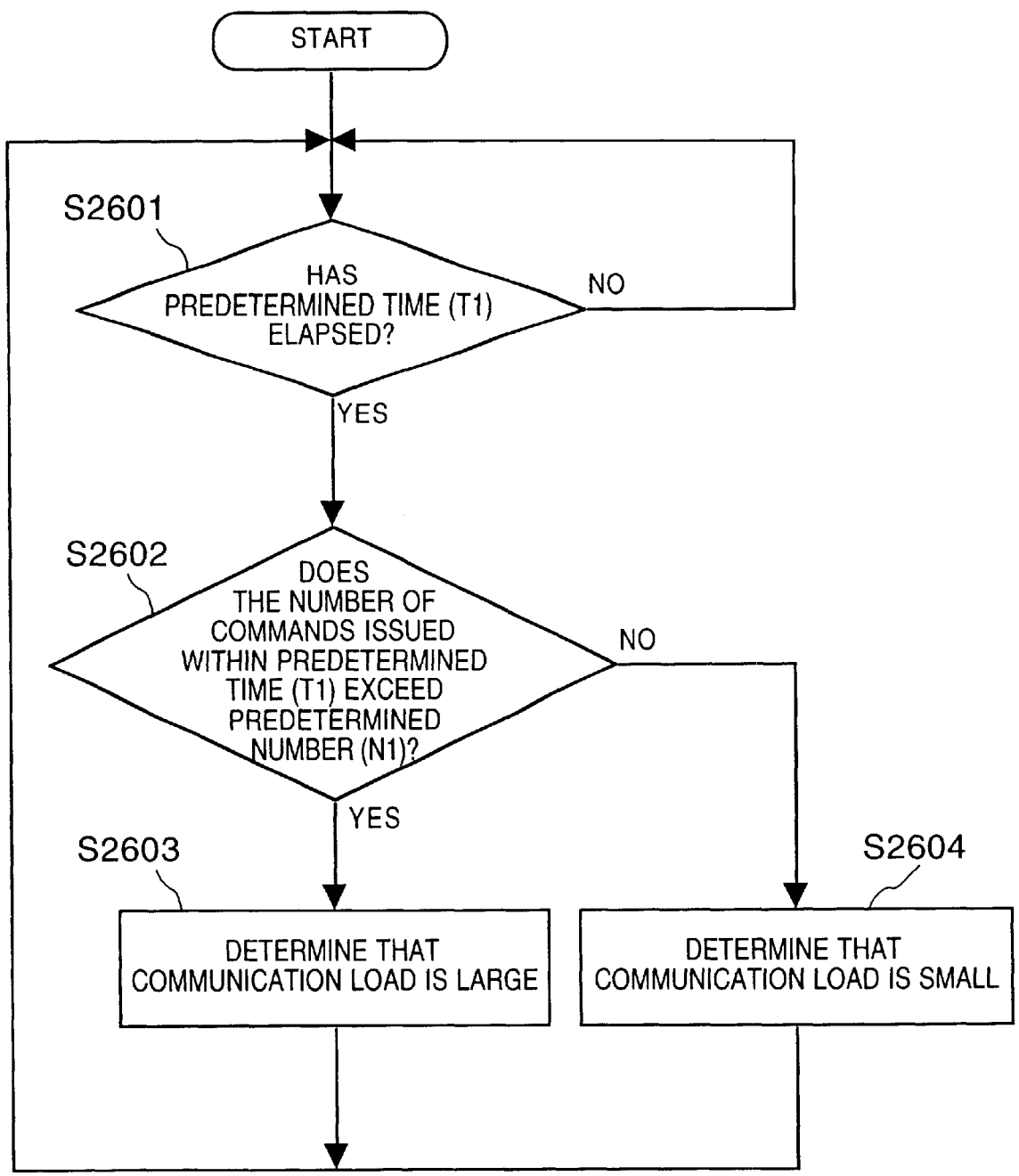
FIG. 26 is flow chart showing the load is determined by monitoring the command issue frequency between the reader controller and the engine control section.

FIG. 26 will be described next. Referring to FIG. 26, the load is determined by monitoring the command issue frequency between the reader controller 901 and the engine control section 2002.

In step S2601; a predetermined time (T1) is measured. The value T1 can be a fixed value or a changeable value. After the elapse of the predetermined time (T1), the number of times of issue of commands within a predetermined time is calculated in step S2602. Since the load detection section S2401 can detect the number of commands issued from each of the printer controller 2103 and reader controller 901, the number of times of issue can be calculated from those values. If the calculated number is equal to or larger than a predetermined number (N1), it is determined that the command issue frequency is high, and it is determined in step S2603 that the communication load is large. If the resultant number is smaller than the predetermined number, it is determined in step S2604 that the issue frequency is low. As described above, referring to FIG. 26, the command issue frequency is monitored to determine the communication load every predetermined time, and the load state is occasionally detected.

Figure 27:
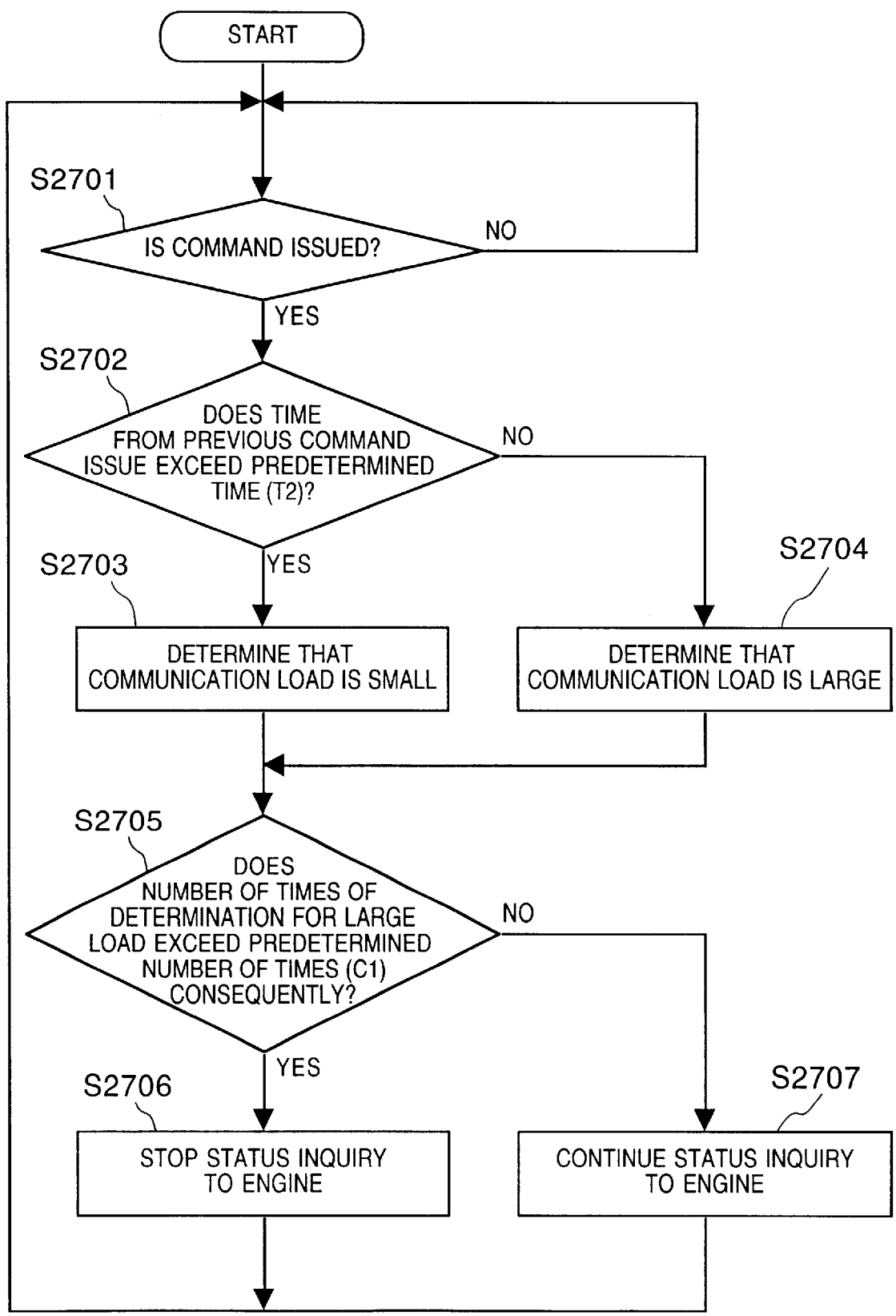
FIG. 27 is flow chart showing the communication load is determined by monitoring the command issue frequency.

FIG. 27 will be described next. Referring to FIG. 27, the communication load is determined by monitoring the command issue frequency, as in FIG. 26. The frequency calculation method is different.

No processing is performed until a command is issued (S2701 is looped). When a command is issued, the condition in step S2701 shifts to that in step S2702. The difference between time when a previous command is issued and the time when the current command is issued is calculated. If the calculated value is equal to or larger than a predetermined time (T2), it is determined that the command issue interval is long. It is determined in step S2703 that the communication load is small. On the other hand, when it is determined that the command issue interval is short, it is determined in step S2704 that the communication load is large. The predetermined time T2 can have a fixed value or a changeable value. In step S2705, the consecutive number of times of determination for the large communication load is calculated. This is processing for channeling. Only when it is determined consecutively a predetermined number of times that the communication load is large, the status inquiry processing to the engine is stopped in step S2706. Otherwise, the status inquiry is continued in step S2707. The method of detecting the communication load every command issue has been described above with reference to FIG. 27.

The control methods shown in FIGS. 26 and 27 can be applied to the block in S2505 in FIG. 25. More specifically, when the job is a copy job, the flow control shown in FIG. 26 or 27 is performed to more finely detect the communication load.

Figure 28:
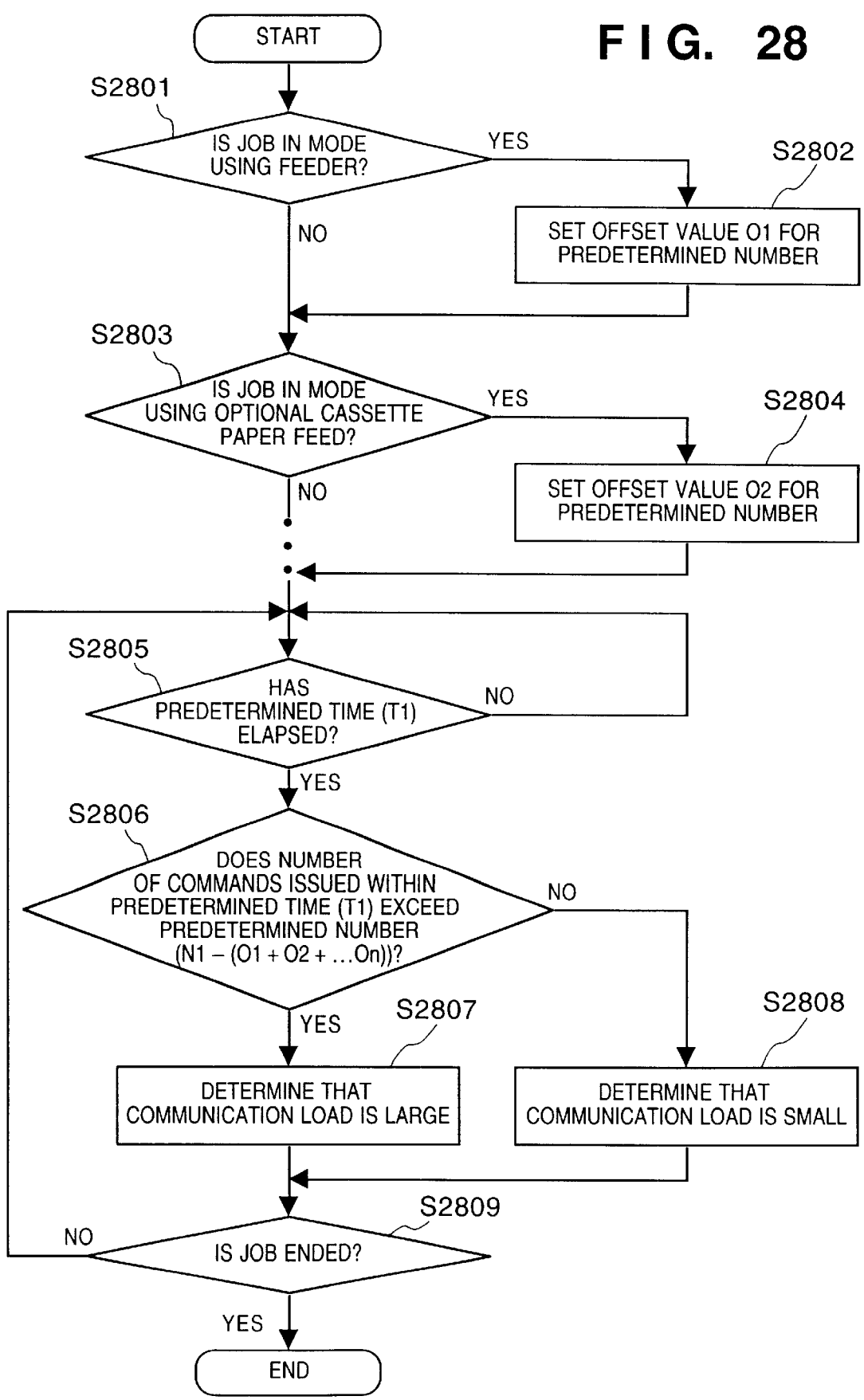
FIG. 28 is flow chart showing a further expanded control method when

FIG. 28 will be described finally. FIG. 28 shows a further expanded control method when FIG. 26 is applied to step S2505 in FIG. 25. Final communication load determination is made in consideration of an offset value corresponding to the copy mode for the comparison value. "START" in FIG. 28 applies to a case wherein the system has a copy job. First, in step S2801, the type of copy job is checked. It is determined first whether the job is in a mode operating using a document feeder. If YES instep S2801, an offset value O1 is set in step S2802. This value also depends on the system arrangement of the reader controller and can be changed in units of systems. The reason for this is as follows. For example, when the feeder itself is controlled by another CPU, the load amount of the CPU differs from that in this arrangement in which one CPU controls all accessories.

It is determined in step S2803 whether the job is in a mode operating using an optional cassette. When an optional cassette is used, an offset value O2 is set. this value can also be changed in units of systems because the CPU load increases in controlling an option, as described above. When a sorter or another accessory is present, a corresponding offset value is set, though a detailed description thereof will be omitted.

When the offset values are calculated, the same processing as described with reference to FIG. 26 is performed. Only a different point is the determination block in S2806. In FIG. 26, the number of times of command issue is simply compared with the predetermined set value N1. In step S2806, the offset value group of values O1 to On (assume that the number of types of accessories is n) is subtracted from the offset value N1, and it is determined whether the number of times of command issue exceeds the resultant value. Since the CPU load of the reader controller is partially applied by accessory control, the number of commands that can be issued within a predetermined time is decreased in consideration of the CPU load, and the probability for determining that the communication load is large is made high.

A number of communication load detection/control methods and control using a combination thereof have been described above.

Other Embodiments

The object of the present invention is realized even by supplying a storage medium storing software program codes for realizing the functions of the above-described embodiment to a system or apparatus, and causing the computer (or a CPU or an MPU) of the system or apparatus to read out and execute the program codes stored in the storage medium.

In this case, the program codes read out from the storage medium realize the functions of the above-described embodiment by themselves, and the storage medium storing the program codes constitutes the present invention.

As a storage medium for supplying the program codes, a floppy disk, a hard disk, an optical disk, a magneto optical disk, a CD-ROM, a CD-R, a magnetic tape, a nonvolatile memory card, a ROM, or the like can be used.

The functions of the above-described embodiment are realized not only when the readout program codes are executed by the computer but also when the OS (Operating System) running on the computer performs part or all of actual processing on the basis of the instructions of the program codes.

The functions of the above-described embodiment are also realized when the program codes readout from the storage medium are written in the memory of a function expansion board inserted into the computer or a function expansion unit connected to the computer, and the CPU of the function expansion board or function expansion unit performs part or all of actual processing on the basis of the instructions of the program codes.

When the load state of the engine control section is determined, and the load is small, latest status information is stored on the reader controller side. If the load is large, control is performed on the basis of data stored in the reader controller to limit communication with the engine control section about the status confirmation request from the printer controller. This allows a composite operation without excessively increasing the communication load even when a plurality of controllers are present.

The present invention is not limited to the above embodiments and various changes and modifications can be made within the spirit and scope of the present invention. Therefore, to apprise the public of the scope of the present invention, the following claims are made.

What is claimed is:

1. An image forming apparatus in which a reader controller is inserted between a printer controller and an engine control section to allow a composite functional operation, comprising:

first communication means for communicating between the printer controller and the reader controller;

second communication means for communicating between the reader controller and the engine control section;

detection means for detecting a load state of the engine control section through said second communication means;

update means for, in accordance with a request of status information from the reader controller, acquiring latest status information of the engine control section through said second communication means and communicating with the reader controller to update the status information;

communication control means for, in communication for a confirmation request of the status information of the engine control section from the printer controller, when the load of the engine control section is large on the basis of the detected load state, communicating the updated status information to the printer controller through said first communication means, and when the load of the engine control section is small, communicating the latest status information updated by said update means through said second communication means to the printer controller through said first communication means, wherein said communication control means limits communication between the printer controller and the engine control section in accordance with a change in the state of the engine control section to control a communication amount.

2. The apparatus according to claim 1, further comprising output means for outputting received information to the engine control section, said output means receiving print information output from the printer controller and image information input for copying and selectively outputting the received information in accordance with the load state of the engine control section as the result of detection by said detection means.

3. The apparatus according to claim 1, wherein said communication control means suppresses processing of received information and sets the information in a queued state in the order of reception in accordance with the state of the engine control section as the result of detection by said detection means.

4. The apparatus according to claim 1, wherein when received information is to be set in a queued state in accordance with the state of the engine control section as the result of detection by said detection means, said communication control means outputs a pseudo processing success command to the printer controller.

5. The apparatus according to claim 4, wherein when the engine control section can communicate in accordance with the state of the engine control section as the result of detection by said detection means, said communication control means transmits the information in the queued state to the engine control section.

6. The apparatus according to claim 1, wherein when a confirmation request of the status information of the engine control section is received from the printer controller, and the status information updated by said update means suffices as the status information requested for confirmation, said communication control means notifies the printer controller of the updated status information through said first communication means, and when the updated status information does not suffice, said communication control means communicates with the engine control section through said second communication means and notifies the printer controller of the result through said first communication means.

7. The apparatus according to claim 1, wherein a CPU load state of said reader controller for controlling accessories can be added to determination conditions of said detection means for detecting a load state.

8. An image forming method in which an image forming apparatus having a reader controller inserted between a printer controller and an engine control section is used, and information is processed by a composite functional operation of said image forming apparatus to form an image, comprising:

the first communication step of processing communication between the printer controller and the reader controller;

the second communication step of processing communication between the reader controller and the engine control section;

the detection step of acquiring information representing a load state of the engine control section in the second communication step and detecting the load state of the engine control section on the basis of the information;

the update step of, in accordance with a request of status information from the reader controller, acquiring latest status information of the engine control section through the second communication step and communicating with the reader controller to update the status information;

the communication control step of, in communication for a confirmation request of the status information of the engine control section from the printer controller, when the load of the engine control section is large on the basis of the detected load state, communicating the updated status information to the printer controller through the first communication step, and when the load of the engine control section is small, communicating the latest status information updated in the update step through the second communication step to the printer controller through the first communication step, wherein the communication control step comprises limiting communication between the printer controller and the engine control section in accordance with a change in the state of the engine control section to control a communication amount.

9. The method according to claim 8, further comprising the output step of outputting received information to the engine control section, the output step comprising receiving print information output from the printer controller and image information input for copying and selectively outputting the received information in accordance with the load state of the engine control section as the result of detection in the detection step.

10. The method according to claim 8, wherein the communication control step comprises suppressing processing of received information and sets the information in a queued state in the order of reception in accordance with the state of the engine control section as the result of detection in the detection step.

11. The method according to claim 8, wherein the communication control step comprises, when received information is to be set in a queued state in accordance with the state of the engine control section as the result of detection in the detection step, outputting a pseudo processing success command to the printer controller.

12. The method according to claim 11, wherein the communication control step comprises, when the engine control section can communicate in accordance with the state of the engine control section as the result of detection in the detection step, transmitting the information in the queued state to the engine control section.

13. The method according to claim 8, wherein when a confirmation request of the status information of the engine control section is received from the printer controller, and the status information updated in the update step suffices as the status information requested for confirmation, the communication control step comprises notifying the printer controller of the updated status information through the first communication step, and when the updated status information does not suffice, the communication control step comprises communicating with the engine control section through the second communication step and notifying the printer controller of the result through the first communication step.

14. The method according to claim 8, wherein a CPU load state of said reader controller for controlling accessories can be added to determination conditions of said detection step for acquiring information representing a load state.

* * * * *

UNITED STATES PATENT AND TRADEMARK OFFICE
CERTIFICATE OF CORRECTION

Figure 14:
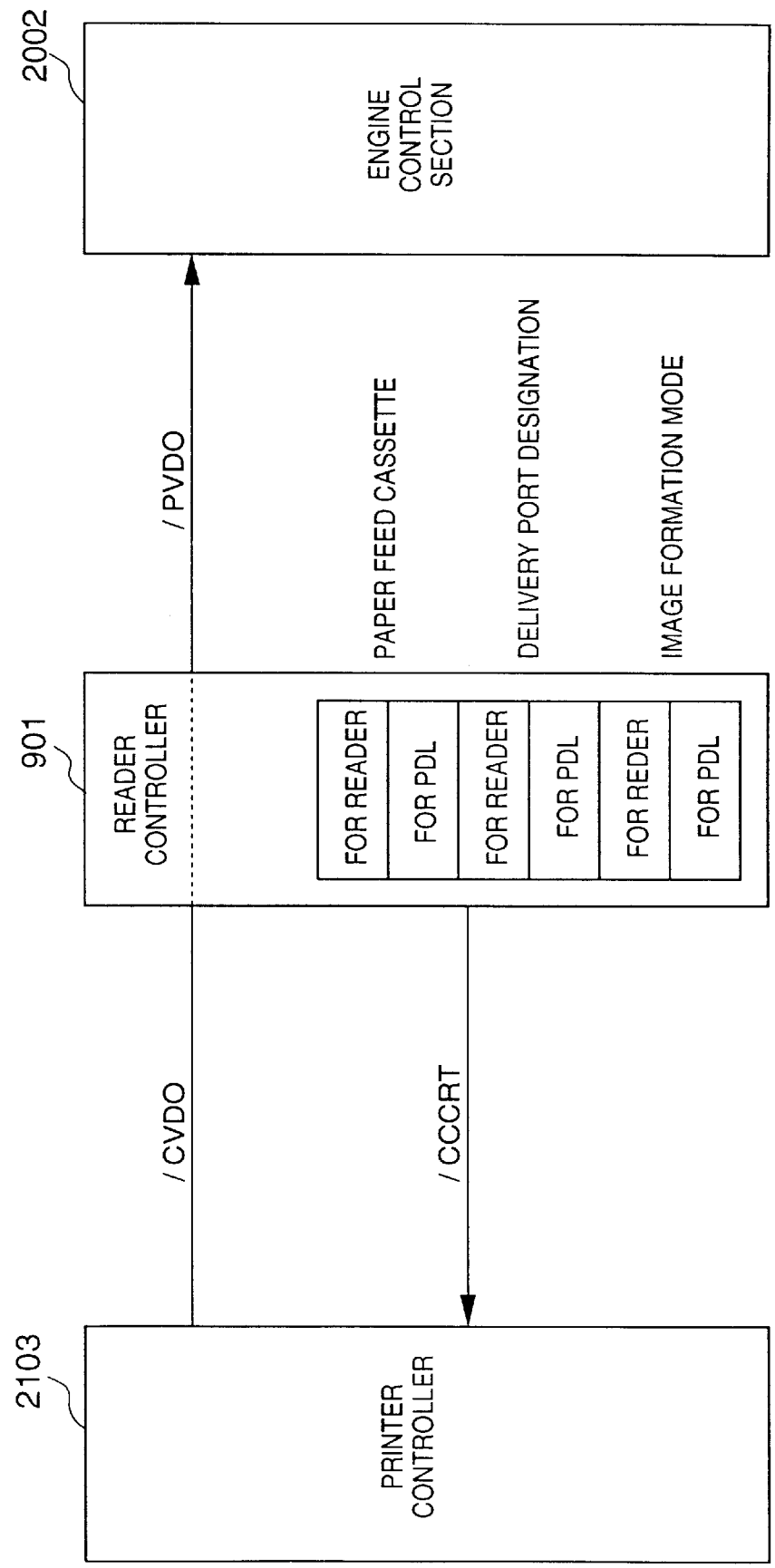
FIG. 14 is a view showing copy request processing during printing.

PATENT NO.    : 6,633,403 B1
DATED         : October 14, 2003
INVENTOR(S)   : Takashi Nonaka It is certified that error appears in the above-identified patent and that said Letters Patent is hereby corrected as shown below:

Drawings,
Sheet 16, Fig. 14, "FOR REDER" should read -- FOR READER --.
Sheet 25, Fig. 23, "PERFROM COPYING OPERATION" should read -- PERFORM COPYING OPERATION --.

Column 2,
Line 65, "to th e" should read -- to the --.

Column 3,
Line 3, "in formation" should read -- information --.

Column 7,
Line 28, "image by" should read -- image is transferred by --.

Column 9,
Line 3, "paper:" should read -- paper --.

Column 10,
Line 45, "2208." should read -- 2208 --.

Column 12,
Line 39, "image and." should read -- image and --.

Column 17,
Line 48, "CCRT." should read -- CCRT --.

Column 18,
Line 50, "S2607;" should read -- S2607, --.

Column 19,
Line 36, "instep" should read -- in step --.
Line 44, "set. this" should read -- set. This --.

UNITED STATES PATENT AND TRADEMARK OFFICE
CERTIFICATE OF CORRECTION

PATENT NO.     : 6,633,403 B1
DATED          : October 14, 2003
INVENTOR(S)    : Takashi Nonaka It is certified that error appears in the above-identified patent and that said Letters Patent is hereby corrected as shown below:

<u>Column 20,</u>
Line 23, "readout" should read -- read out --.

Signed and Sealed this

Thirteenth Day of April, 2004

JON W. DUDAS
*Acting Director of the United States Patent and Trademark Office*